United States Patent
Kuritsyn et al.

(10) Patent No.: US 12,535,420 B2
(45) Date of Patent: Jan. 27, 2026

(54) HIGHLY MULTIPLEXED NUCLEIC ACID SEQUENCING SYSTEMS

(71) Applicant: Pacific Biosciences of California, Inc., Menlo Park, CA (US)

(72) Inventors: Alexey Kuritsyn, San Jose, CA (US); Mark Mcdonald, Milpitas, CA (US); Aaron Rulison, Los Altos, CA (US); Annette Grot, Cupertino, CA (US)

(73) Assignee: PACIFIC BIOSCIENCES OF CALIFORNIA, INC., Menlo Park, CA (US)

( * ) Notice: Subject to any disclaimer, the term of this patent is extended or adjusted under 35 U.S.C. 154(b) by 491 days.

(21) Appl. No.: 17/179,353

(22) Filed: Feb. 18, 2021

(65) Prior Publication Data
US 2021/0285881 A1    Sep. 16, 2021

Related U.S. Application Data

(60) Provisional application No. 62/978,206, filed on Feb. 18, 2020.

(51) Int. Cl.
*G01N 21/77* (2006.01)
*G01N 21/64* (2006.01)

(52) U.S. Cl.
CPC ..... *G01N 21/6454* (2013.01); *G01N 21/6486* (2013.01); *G01N 2021/7786* (2013.01); *G01N 2201/0873* (2013.01)

(58) Field of Classification Search
CPC ........... G01N 21/6452; G01N 21/7742; G01N 21/7746; G01N 33/54373; G01N 2201/08;
(Continued)

(56) References Cited

U.S. PATENT DOCUMENTS 3,674,335 A    7/1972    Ashkin et al.
3,916,182 A    10/1975   Dabby et al.
(Continued)

FOREIGN PATENT DOCUMENTS

CN    102460254 A    5/2012
EP    1105529 B1     11/2005
(Continued)

OTHER PUBLICATIONS

Abbas et al. (2011) Sens. Actuators B Chem. 156:169-175.
(Continued)

*Primary Examiner* — Isiaka O Akanbi
(74) *Attorney, Agent, or Firm* — VLP Law Group LLP

(57) ABSTRACT

Provided herein are highly multiplexed optical analytical systems for improved nucleic acid sequencing. The systems include a plurality of highly multiplexed optical chips, at least one optical source, and a plurality of optical delivery devices for illuminating an array of nanoscale rection regions on each of the optical chips. In use, the reaction regions contain fluorescent nucleic acid sequencing reagents and are arranged to report nucleic acid sequence information to optical detectors associated with the multiplexed optical chips in real time. The systems enable a massive increase in the scale of nucleic acid sequencing reactions capable of being performed within a single instrument without a corresponding increase in size, complexity, or cost of the instrument.

31 Claims, 17 Drawing Sheets

(58) Field of Classification Search
CPC ....... G01N 2201/0826; G01N 15/1484; G01N 27/44782; G01N 2021/6484; C12Q 1/6874; C12Q 1/6825; C12Q 1/6876; B01L 2300/0654; B01L 2300/0636; B01L 3/5027; B01L 2200/027; B01L 9/527
USPC ........ 356/432–440, 335–343, 246, 328, 326; 435/288.5, 4, 5, 287.1, 287.2; 422/50, 422/103, 82.11, 82.05
See application file for complete search history.

(56) References Cited

U.S. PATENT DOCUMENTS

| | | | |
|---|---|---|---|
| 4,095,791 | A | 6/1978 | Smith et al. |
| 4,149,027 | A | 4/1979 | Asher et al. |
| 4,634,215 | A | 1/1987 | Reule |
| 4,645,523 | A | 2/1987 | Howard et al. |
| 4,763,300 | A | 8/1988 | Yukawa |
| 5,033,812 | A | 7/1991 | Yoshida et al. |
| 5,082,629 | A * | 1/1992 | Burgess, Jr. ......... G01N 21/552 385/12 |
| 5,094,517 | A | 3/1992 | Franke |
| 5,101,459 | A | 3/1992 | Sunagawa |
| 5,132,843 | A | 7/1992 | Aoyama et al. |
| 5,135,876 | A | 8/1992 | Andrade et al. |
| 5,157,262 | A | 10/1992 | Marsoner et al. |
| 5,159,661 | A | 10/1992 | Ovshinsky et al. |
| 5,173,747 | A | 12/1992 | Boiarski et al. |
| 5,192,502 | A | 3/1993 | Attridge et al. |
| 5,195,152 | A | 3/1993 | Gupta |
| 5,233,673 | A | 8/1993 | Vali et al. |
| 5,239,178 | A | 8/1993 | Derndinger et al. |
| 5,439,647 | A | 8/1995 | Saini |
| 5,446,534 | A | 8/1995 | Goldman |
| 5,470,710 | A | 11/1995 | Weiss et al. |
| 5,502,781 | A | 3/1996 | Li et al. |
| 5,545,531 | A | 8/1996 | Rava et al. |
| 5,578,832 | A | 11/1996 | Trulson et al. |
| 5,605,662 | A | 2/1997 | Heller et al. |
| 5,631,734 | A | 5/1997 | Stern et al. |
| 5,677,196 | A | 10/1997 | Herron et al. |
| 5,695,934 | A | 12/1997 | Brenner |
| 5,744,305 | A | 4/1998 | Fodor et al. |
| 5,812,709 | A | 9/1998 | Arai et al. |
| 5,821,058 | A | 10/1998 | Smith et al. |
| 5,832,165 | A | 11/1998 | Reichert et al. |
| 5,867,266 | A | 2/1999 | Craighead |
| 5,919,712 | A | 7/1999 | Herron et al. |
| 6,002,520 | A | 12/1999 | Hoch et al. |
| 6,071,748 | A | 6/2000 | Modlin et al. |
| 6,084,667 | A * | 7/2000 | Melman .......... G01N 27/44721 356/246 |
| 6,192,168 | B1 | 2/2001 | Feldstein et al. |
| 6,210,896 | B1 | 4/2001 | Chan |
| 6,236,945 | B1 | 5/2001 | Simpson et al. |
| 6,239,891 | B1 | 5/2001 | Nakama |
| 6,263,286 | B1 | 7/2001 | Gilmanshin et al. |
| 6,304,706 | B1 | 10/2001 | Sugita et al. |
| 6,325,977 | B1 | 12/2001 | Theil |
| 6,388,788 | B1 | 5/2002 | Harris et al. |
| 6,437,345 | B1 | 8/2002 | Bruno-Raimondi et al. |
| 6,438,279 | B1 | 8/2002 | Craighead et al. |
| 6,603,537 | B1 | 8/2003 | Dietz et al. |
| 6,611,634 | B2 | 8/2003 | Herron et al. |
| 6,690,002 | B2 | 2/2004 | Kuroda et al. |
| 6,699,655 | B2 | 3/2004 | Nikiforov |
| 6,709,276 | B2 | 3/2004 | Barringer et al. |
| 6,759,662 | B1 * | 7/2004 | Li ................... G01N 27/44721 356/213 |
| 6,760,499 | B2 | 7/2004 | Pezeshki et al. |
| 6,784,982 | B1 | 8/2004 | Blumenfeld et al. |
| 6,800,860 | B2 | 10/2004 | Dietz et al. |
| 6,818,395 | B1 | 11/2004 | Quake et al. |
| 6,846,115 | B1 | 1/2005 | Shang et al. |
| 6,847,748 | B2 | 1/2005 | Benzoni et al. |
| 6,856,751 | B2 | 2/2005 | Oaknin et al. |
| 6,917,726 | B2 | 7/2005 | Levene et al. |
| 6,919,211 | B1 | 7/2005 | Fodor et al. |
| 6,973,232 | B2 | 12/2005 | Betty et al. |
| 6,979,830 | B2 | 12/2005 | Dietz et al. |
| 6,982,146 | B1 | 1/2006 | Schneider et al. |
| 6,987,613 | B2 | 1/2006 | Pocius et al. |
| 7,013,054 | B2 | 3/2006 | Levene et al. |
| 7,022,515 | B2 | 4/2006 | Herron et al. |
| 7,056,661 | B2 | 6/2006 | Korlach et al. |
| 7,057,832 | B2 | 6/2006 | Wu et al. |
| 7,058,261 | B2 | 6/2006 | Ghiron et al. |
| 7,058,275 | B2 | 6/2006 | Sezerman et al. |
| 7,065,272 | B2 | 6/2006 | Taillaert et al. |
| 7,075,695 | B2 | 7/2006 | Gronbach |
| 7,081,954 | B2 | 7/2006 | Sandstrom |
| 7,083,914 | B2 | 8/2006 | Seul et al. |
| 7,129,470 | B2 | 10/2006 | MacDougall |
| 7,130,041 | B2 | 10/2006 | Bouzid et al. |
| 7,135,667 | B2 | 11/2006 | Oldham et al. |
| 7,139,074 | B2 | 11/2006 | Reel |
| 7,145,645 | B2 | 12/2006 | Blumenfeld et al. |
| 7,146,087 | B2 | 12/2006 | Heideman et al. |
| 7,150,997 | B2 | 12/2006 | Kovacs |
| 7,162,124 | B1 | 1/2007 | Gunn, III et al. |
| 7,170,050 | B2 | 1/2007 | Turner et al. |
| 7,175,811 | B2 | 2/2007 | Bach et al. |
| 7,181,122 | B1 | 2/2007 | Levene et al. |
| 7,184,625 | B2 | 2/2007 | Gunn, III et al. |
| 7,189,361 | B2 | 3/2007 | Carson et al. |
| 7,194,166 | B1 | 3/2007 | Gunn, III |
| 7,197,196 | B2 | 3/2007 | Lin et al. |
| 7,199,357 | B1 | 4/2007 | Oldham et al. |
| 7,209,836 | B1 | 4/2007 | Schermer et al. |
| 7,227,128 | B2 | 6/2007 | Sagatelyan |
| 7,245,803 | B2 | 7/2007 | Gunn, III et al. |
| RE39,772 | E | 8/2007 | Herron et al. |
| 7,257,141 | B2 | 8/2007 | Chua |
| 7,265,840 | B2 | 9/2007 | Cheng |
| 7,283,705 | B2 | 10/2007 | Paek et al. |
| 7,298,478 | B2 * | 11/2007 | Gilbert .............. G01N 21/6452 356/338 |
| 7,298,941 | B2 | 11/2007 | Palen et al. |
| 7,302,146 | B2 | 11/2007 | Turner et al. |
| 7,302,348 | B2 | 11/2007 | Ghosh et al. |
| 7,315,019 | B2 | 1/2008 | Turner et al. |
| 7,323,681 | B1 | 1/2008 | Oldham et al. |
| 7,376,308 | B2 | 5/2008 | Cheben et al. |
| 7,400,380 | B2 | 7/2008 | Hahn |
| 7,486,865 | B2 | 2/2009 | Foquet et al. |
| 7,499,094 | B2 | 3/2009 | Kuriyama |
| 7,537,734 | B2 | 5/2009 | Reichert et al. |
| 7,583,875 | B2 | 9/2009 | Yamauchi et al. |
| 7,684,660 | B2 | 3/2010 | Braunisch et al. |
| 7,709,808 | B2 | 5/2010 | Reel et al. |
| 7,767,441 | B2 | 8/2010 | Chiou et al. |
| 7,792,402 | B2 | 9/2010 | Peng |
| 7,811,810 | B2 | 10/2010 | Chiou et al. |
| 7,817,281 | B2 | 10/2010 | Kiesel et al. |
| 7,820,983 | B2 | 10/2010 | Lundquist et al. |
| 7,826,697 | B2 | 11/2010 | Presley et al. |
| 7,834,329 | B2 | 11/2010 | Lundquist et al. |
| 7,838,847 | B2 | 11/2010 | Lundquist et al. |
| 7,907,800 | B2 | 3/2011 | Foquet et al. |
| 8,053,742 | B2 | 11/2011 | Lundquist et al. |
| 8,182,993 | B2 | 5/2012 | Tomaney et al. |
| 8,207,509 | B2 | 6/2012 | Lundquist et al. |
| 8,247,216 | B2 | 8/2012 | Zaccarin et al. |
| 8,264,936 | B2 | 9/2012 | Tanaka et al. |
| 8,274,040 | B2 | 9/2012 | Zhong et al. |
| 8,288,157 | B2 * | 10/2012 | Duer ................. G01N 21/7703 436/805 |
| 8,411,375 | B2 | 4/2013 | Lenchenkov |
| 8,447,150 | B2 | 5/2013 | Kopp |
| 8,465,699 | B2 | 6/2013 | Fehr et al. |
| 8,467,061 | B2 | 6/2013 | McCaffrey et al. |
| 8,471,219 | B2 | 6/2013 | Lundquist et al. |
| 8,501,406 | B1 | 8/2013 | Gray et al. |
| 8,594,503 | B2 | 11/2013 | Roelkens et al. |

(56) References Cited

U.S. PATENT DOCUMENTS

| | | |
|---|---|---|
| 8,618,507 B1 | 12/2013 | Lundquist et al. |
| 8,791,405 B2 | 7/2014 | Ji et al. |
| 8,802,600 B2 | 8/2014 | Rank et al. |
| 8,865,077 B2 | 10/2014 | Chiou et al. |
| 8,883,018 B2 | 11/2014 | Doerr |
| 8,899,848 B2 | 12/2014 | Rossetto |
| 8,906,320 B1 | 12/2014 | Eltoukhy et al. |
| 8,906,670 B2 | 12/2014 | Gray et al. |
| 8,993,307 B2 | 3/2015 | Zaccarin et al. |
| 8,994,946 B2 | 3/2015 | McCaffrey et al. |
| 9,029,802 B2 | 5/2015 | Lundquist et al. |
| 9,223,084 B2 | 12/2015 | Grot et al. |
| 9,372,308 B1 | 6/2016 | Saxena et al. |
| 9,624,540 B2 | 4/2017 | Lundquist et al. |
| 10,487,356 B2 | 11/2019 | Lundquist et al. |
| 10,767,219 B2 | 9/2020 | Sabounchi et al. |
| 2002/0034457 A1 | 3/2002 | Reichert et al. |
| 2002/0110839 A1 | 8/2002 | Bach et al. |
| 2002/0113213 A1 | 8/2002 | Amirkhanian et al. |
| 2002/0146047 A1 | 10/2002 | Bendett et al. |
| 2002/0154376 A1 | 10/2002 | Vail et al. |
| 2002/0197010 A1 | 12/2002 | Kato et al. |
| 2003/0044781 A1 | 3/2003 | Korlach et al. |
| 2003/0132406 A1 | 7/2003 | Waldhausl et al. |
| 2003/0138180 A1 | 7/2003 | Kondo et al. |
| 2003/0174324 A1 | 9/2003 | Sandstrom |
| 2003/0174992 A1 | 9/2003 | Levene et al. |
| 2004/0040868 A1 | 3/2004 | DeNuzzio et al. |
| 2004/0046128 A1 | 3/2004 | Abel et al. |
| 2004/0156590 A1 | 8/2004 | Gunn, III et al. |
| 2004/0197793 A1 | 10/2004 | Hassibi et al. |
| 2004/0249227 A1 | 12/2004 | Klapproth et al. |
| 2005/0006607 A1 | 1/2005 | Winter et al. |
| 2005/0014178 A1 | 1/2005 | Holm-Kennedy |
| 2005/0018970 A1 | 1/2005 | Tseng et al. |
| 2005/0135974 A1 | 6/2005 | Harvey et al. |
| 2005/0175273 A1 | 8/2005 | Iida et al. |
| 2005/0201899 A1 | 9/2005 | Weisbuch |
| 2005/0206895 A1 | 9/2005 | Salmelainen |
| 2006/0060766 A1 | 3/2006 | Turner et al. |
| 2006/0083469 A1 | 4/2006 | Faid et al. |
| 2006/0103850 A1 | 5/2006 | Alphonse et al. |
| 2006/0180750 A1 | 8/2006 | Gollier et al. |
| 2007/0036511 A1 | 2/2007 | Lundquist et al. |
| 2007/0081782 A1 | 4/2007 | Maeda et al. |
| 2007/0099212 A1 | 5/2007 | Harris |
| 2007/0134128 A1 | 6/2007 | Korlach |
| 2007/0146701 A1 | 6/2007 | Kiesel et al. |
| 2007/0188746 A1 | 8/2007 | Kraus et al. |
| 2007/0196815 A1 | 8/2007 | Lappe et al. |
| 2008/0002929 A1 | 1/2008 | Bowers et al. |
| 2008/0020938 A1 | 1/2008 | Kaplan |
| 2008/0039339 A1 | 2/2008 | Hassibi et al. |
| 2008/0056950 A1 | 3/2008 | Weisbuch et al. |
| 2008/0099430 A1 | 5/2008 | Brooks et al. |
| 2008/0128627 A1 | 6/2008 | Lundquist et al. |
| 2008/0161195 A1 | 7/2008 | Turner et al. |
| 2008/0176769 A1 | 7/2008 | Rank et al. |
| 2008/0212960 A1 | 9/2008 | Lundquist et al. |
| 2008/0304802 A1 | 12/2008 | Watanabe et al. |
| 2009/0060526 A1 | 3/2009 | Matsui et al. |
| 2009/0146076 A1 | 6/2009 | Chiou et al. |
| 2009/0168151 A1 | 7/2009 | Ruschin et al. |
| 2009/0181396 A1 | 7/2009 | Luong et al. |
| 2009/0208957 A1 | 8/2009 | Korlach et al. |
| 2009/0218514 A1 | 9/2009 | Klunder et al. |
| 2009/0247414 A1 | 10/2009 | Obradovic et al. |
| 2009/0311774 A1 | 12/2009 | Chiou et al. |
| 2009/0312188 A1 | 12/2009 | Duer et al. |
| 2009/0317074 A1 | 12/2009 | Tan et al. |
| 2010/0065726 A1 | 3/2010 | Zhong et al. |
| 2010/0099100 A1 | 4/2010 | Zaccarin et al. |
| 2010/0121582 A1 | 5/2010 | Pan et al. |
| 2010/0163521 A1 | 7/2010 | Balamane et al. |
| 2010/0255488 A1 | 10/2010 | Kong et al. |
| 2010/0256918 A1 | 10/2010 | Chen et al. |
| 2010/0295083 A1 | 11/2010 | Celler |
| 2011/0117637 A1 | 5/2011 | Gray et al. |
| 2011/0123184 A1* | 5/2011 | Mather ............... H04M 19/048 396/176 |
| 2011/0183409 A1 | 7/2011 | Newby et al. |
| 2011/0210094 A1 | 9/2011 | Gray et al. |
| 2011/0222179 A1 | 9/2011 | Monadgemi |
| 2011/0223590 A1 | 9/2011 | Chiou et al. |
| 2011/0257040 A1 | 10/2011 | Turner et al. |
| 2011/0306039 A1 | 12/2011 | Chiou et al. |
| 2012/0002395 A1 | 1/2012 | Du et al. |
| 2012/0014837 A1 | 1/2012 | Fehr et al. |
| 2012/0019828 A1 | 1/2012 | McCaffrey et al. |
| 2012/0021525 A1 | 1/2012 | Fehr et al. |
| 2012/0052506 A1 | 3/2012 | Yue et al. |
| 2012/0058469 A1 | 3/2012 | Shen |
| 2012/0058473 A1 | 3/2012 | Yue et al. |
| 2012/0058482 A1 | 3/2012 | Shen et al. |
| 2012/0077189 A1 | 3/2012 | Shen et al. |
| 2012/0085894 A1 | 4/2012 | Zhong et al. |
| 2012/0156100 A1 | 6/2012 | Tsai et al. |
| 2013/0043552 A1 | 2/2013 | Lazarov et al. |
| 2013/0071850 A1 | 3/2013 | Duer |
| 2013/0148682 A1 | 6/2013 | Zhang et al. |
| 2014/0147079 A1 | 5/2014 | Doerr et al. |
| 2014/0177995 A1 | 6/2014 | Mohammed et al. |
| 2014/0193115 A1 | 7/2014 | Popovic |
| 2014/0193331 A1 | 7/2014 | Naczynski et al. |
| 2014/0199016 A1 | 7/2014 | Grot et al. |
| 2014/0240951 A1 | 8/2014 | Brady et al. |
| 2014/0241682 A1 | 8/2014 | Sandhu et al. |
| 2014/0287964 A1 | 9/2014 | Lundquist et al. |
| 2014/0348462 A1 | 11/2014 | Yabre |
| 2014/0353577 A1 | 12/2014 | Agarwal et al. |
| 2014/0367589 A1 | 12/2014 | Chiou et al. |
| 2015/0001175 A1 | 1/2015 | Rabiei |
| 2015/0056097 A1* | 2/2015 | Vaartstra ............ G01N 21/6454 422/69 |
| 2015/0063816 A1 | 3/2015 | Papakos et al. |
| 2015/0117808 A1 | 4/2015 | Chen et al. |
| 2015/0141267 A1 | 5/2015 | Rothberg et al. |
| 2015/0286060 A1 | 10/2015 | Roh et al. |
| 2015/0293021 A1 | 10/2015 | Finkelstein et al. |
| 2016/0041095 A1* | 2/2016 | Rothberg ............. G01N 21/648 506/4 |
| 2016/0061740 A1 | 3/2016 | Grot et al. |
| 2016/0084761 A1 | 3/2016 | Rothberg et al. |
| 2016/0154165 A1 | 6/2016 | Grot et al. |
| 2016/0216538 A1 | 7/2016 | McDonald et al. |
| 2016/0273034 A1* | 9/2016 | Lundquist .......... G01N 21/6452 |
| 2016/0334334 A1 | 11/2016 | Saxena et al. |
| 2016/0350937 A1* | 12/2016 | Balagurusamy ........ G06T 7/246 |
| 2016/0363728 A1* | 12/2016 | Wang ................. G01N 21/774 |
| 2017/0145498 A1 | 5/2017 | Saxena et al. |
| 2017/0350818 A1* | 12/2017 | Rothberg .......... G01N 33/54373 |
| 2018/0095039 A1* | 4/2018 | Cao ........................ H01J 31/501 |
| 2019/0025214 A1* | 1/2019 | Rothberg ............. H01S 5/0262 |
| 2019/0179078 A1 | 6/2019 | Kuritsyn et al. |
| 2019/0249237 A1 | 8/2019 | Kamtekar et al. |
| 2019/0249242 A1 | 8/2019 | Korlach et al. |
| 2020/0049882 A1 | 2/2020 | Wang et al. |
| 2021/0033788 A1 | 2/2021 | Wang et al. |
| 2021/0215607 A1* | 7/2021 | Berman ............. G01N 21/6428 |

FOREIGN PATENT DOCUMENTS

| | | |
|---|---|---|
| EP | 1871902 B1 | 10/2010 |
| EP | 2362209 B1 | 10/2015 |
| KR | 20050088782 A | 9/2005 |
| WO | 1991006678 A1 | 5/1991 |
| WO | 2000052518 A1 | 9/2000 |
| WO | 2001016375 A2 | 3/2001 |
| WO | 2004100068 A2 | 11/2004 |
| WO | 2006061783 A1 | 6/2006 |
| WO | 2006116726 A2 | 11/2006 |
| WO | 2006135782 A2 | 12/2006 |
| WO | 2007002367 A2 | 1/2007 |
| WO | 2007011549 A1 | 1/2007 |

(56) References Cited

FOREIGN PATENT DOCUMENTS

| WO | 2008002765 A2 | 1/2008 |
| WO | 2009056065 A1 | 5/2009 |
| WO | 2009131535 A1 | 10/2009 |
| WO | 2009149125 A2 | 12/2009 |
| WO | 2010051773 A1 | 5/2010 |
| WO | 2010102567 A1 | 9/2010 |
| WO | 2010127001 A1 | 11/2010 |
| WO | 2011076132 A2 | 6/2011 |
| WO | 2011126718 A1 | 10/2011 |
| WO | 2012064472 A2 | 5/2012 |
| WO | 2012129068 A1 | 9/2012 |
| WO | 2013037900 A1 | 3/2013 |
| WO | 2013173844 A1 | 11/2013 |
| WO | 2014031157 A1 | 2/2014 |
| WO | 2014064228 A1 | 5/2014 |
| WO | 2017087974 A1 | 5/2017 |
| WO | 2017087975 A1 | 5/2017 |
| WO | 2019090192 A1 | 5/2019 |
| WO | 2021146443 A1 | 7/2021 |

OTHER PUBLICATIONS

Balakrishnan "Planar Lightwave Circuits Enable Next-Generation 40G/100G Networks".
Barrios (2006) IEEE Photon Technol. Lett. 18:2419.
Barrios et al. (2007) Optics Letters 32:3080.
Barrios et al. (2008) Optics Letters 33:708.
Bernini et al. (2005) Proc. SPIE 5728:101-111.
Boiarski et al. (1992) Proc. SPIE 1793:199-211.
Budach et al. (1999) Anal. Chem. 71(16):3347-3355.
Chen et al. (2012) Optics Letters 37:2814.
Cottier et al. (2002) Proc. SPIE 4616:53-63.
Deopura, M. et al. (2001) Optics Lett 26(15):1197-1199.
Duveneck et al. (2002) Anal Chem Acta 469:49-61.
Eid et al. (2009) Science 323:133.
Feldstein et al. (1999) J. Biomed Microdev. 1:139-153.
Feng et al. (2006) IEEE J. Quantum Electron. 42:885.
Feng et al. (2007) Optics Letters 32:2131.
Fink, Y. et al. (1998) Science 282:1679-1682.
Fonollosa et al. (2006) Proceedings of SPIE 61860R-1: 61860R-11.
Franc et al. (2006) Proceedings of SPIE 6185:61851F.
Fujikura Ltd. (2014) Introduction of PANDA Fibers 1-57.
Heng (2011) Phys Org 6 "Silicon Waveguide that Converts Polarization Mode of Light Could Speed Up Photonic Circuits Operation".
Herron et al. (2003) Biopolymers at Interfaces 2nd Ed, Surfactant Science Series vol. 110, Marcel Dekker, NY pp. 115-163.
Kempen et al. (1997) Sensors and Actuators B 39:295 (DOI: 10.1016/S0925-4005(97)80222-5).
Laurell et al. (2012) Optics Express 20:22308.
Levene, M.J. et al. (2003) Science 299:682-686.
Li et al. (2004) Electronic Components and Technology Conference 1925-1928 "Photolithography of 3D Topology in Si Optical Bench for Self-aligned Placement of Laser Dies".
Lim et al. (2006) IEEE Journal of Selected Topics in Quantum Electronics 12(6):1461-1468.
Mortazavi et al. (1994) Optics Letters 19:1290.
Nava et al. (2010) Electronics Letters 46:1686.
Pan et al. (2011) Optics Communications 284:429.
Papes et al. (2016) Optics Express 5026 vol. 24, No. 5 (DOI:10.1364/OE.24.005026).
Psaltis et al. (2006) Nature 442:381.
Robinson et al. (2008) Optics Express 16:4296.
Rolland et al. (2004) J. Am. Chem. Soc. 126:2322-2323.
Romero-Garcia (2013) Optics Express 21(12):14036-14046.
Sahin et al. (2011) J. Nanophoton. 5:051812.
Salama et al. (2004) Biosensors & Bioelectronics 19:1377-1386.
Song et al. (2012) Optics Express 20:22290.
Sun et al. (2007) Optics Express 15:17967.
Tuma et al. (1995) NASA Lewis Research Center 1-13 "Calculated Coupling Efficiency Between an Elliptical-core Optical Fiber and a Silicon Oxynitride Rib Waveguide".
Van Laere et al. (2006) Photonics "Compact Focusing Grating Couplers Between Optical Fibers and Silicon-on-Insulator Photonic Wire Waveguides".
Van Laere et al. (2007) Journal of Lightwave Technology 25(1):151-156.
Waldhausl et al. (1997) Applied Optics 36(36):9383-9390.
Weissman et al. (1999) Proc. SPIE 3596:210-216.
Wu et al. (2006) Biosensors and Bioelectronics 21:1252-1263.
Yao et al. (2012) Nonlinear Optics and Solid-State Lasers, Springer-Verlag Berlin Heidelberg, Chapter 5.
Yariv, A. et al. (1977) IEEE J Quantum Elec QE-13(4):233-253.
Zhang et al. (2010) Optics Express 18(24):25264-25270.
International Search Report and Written Opinion dated Apr. 28, 21 for related PCT/US2021/018631.
Extended European search report dated Feb. 29, 24 for related EP21756500.1.

* cited by examiner

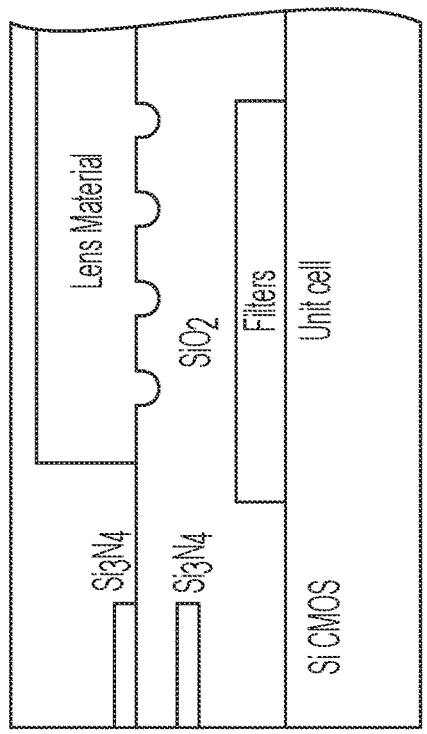
FIG. 14A
FIG. 14B
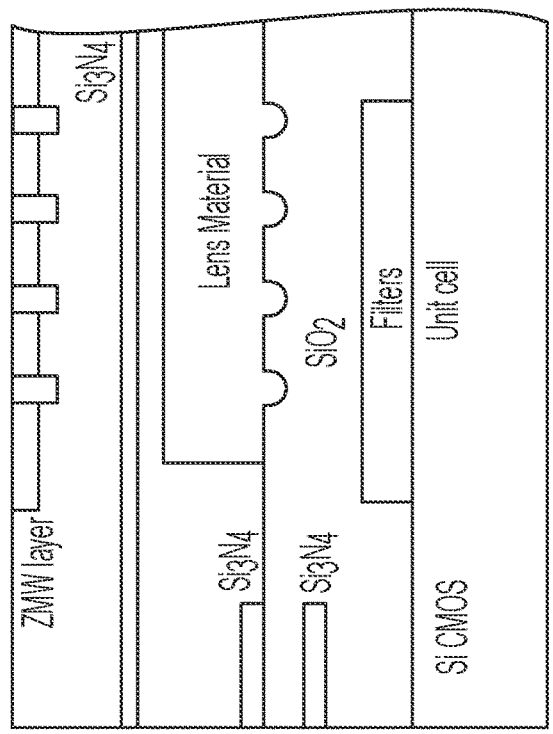
FIG. 14D
FIG. 14E
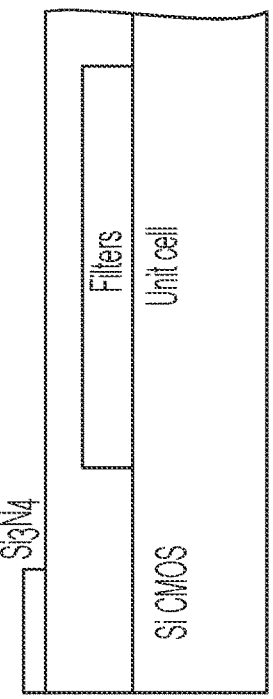
FIG. 14C

HIGHLY MULTIPLEXED NUCLEIC ACID SEQUENCING SYSTEMS

CROSS-REFERENCE TO RELATED APPLICATIONS

This application claims the benefit of U.S. Provisional Application No. 62/978,206, filed on Feb. 18, 2020, the disclosure of which is incorporated herein by reference in its entirety.

STATEMENT REGARDING FEDERALLY SPONSORED RESEARCH

Not Applicable.

BACKGROUND OF THE INVENTION

As multiplexed analytical systems continue to be miniaturized in size, expanded in scale, and increased in power and throughput, the need to develop improved systems capable of such functionality becomes more important. Furthermore, many analytical techniques are initially available only at high cost, and they can only be performed in controlled, laboratory settings by highly-trained laboratory technicians. For example, nucleic acid sequencing was originally possible only in research laboratories, using techniques and equipment that were expensive and complicated to perform. Advances in nucleic acid sequencing technologies have brought down the cost per unit sequenced and have therefore greatly expanded the availability of sequence data, but the sequencing reactions must still typically be performed in sophisticated laboratories with expensive equipment by highly trained individuals.

Many optical analytical techniques likewise rely on sophisticated equipment and expertise, and they are therefore also expensive and complicated to scale up. For example, conventional optical systems employ complex optical trains that direct, focus, filter, split, separate, and detect light to and from the sample materials. Such systems typically employ an assortment of different optical elements to direct, modify, and otherwise manipulate light entering and leaving a reaction site. Such systems are typically complex and costly and tend to have significant space requirements. For example, typical systems employ mirrors and prisms in directing light from its source to a desired destination. Additionally, such systems may include light-splitting optics such as beam-splitting prisms or diffraction gratings to generate two or more beams from a single original beam.

Integrated optical systems for nucleic acid sequencing have recently become available that enable large-scale, even genomic-scale, nucleic acid sequencing to be performed with standardized and commercially available laboratory equipment. See, for example, U.S. Patent Publication Nos. 2012/0014837, 2012/0021525, 2012/0019828, and 2016/0061740. In some cases, these systems may comprise an optical microchip that contains an array of nanoscale integrated analytical devices, each unit cell comprising a "zero mode waveguide" (ZMW) or "nanowell" where the individual nucleic acid sequencing reactions occur. The microchips are routinely manufactured using standard semiconductor fabrication techniques, such as deposition, etching, and patterning techniques, that are well known in the semiconductor industry. The techniques enable miniaturization of an optical analytical device to the nanoscale, so that millions, or even tens of millions, of individual nucleic acid sequencing reactions can be performed on a single optical chip in real time. Increasing the scale of the sequencing arrays beyond this size is difficult, however, as there can be design rule constraints relating to wafer field stitching, number of dies per wafer, and chip yield concerns. Increasing the multiplex by decreasing the size of an individual unit cell can also be difficult, owing to crosstalk between unit cells and other limitations, for example limitations in the methods available for chip fabrication. In each case, servicing an increased sequencing area on a single microchip with suitable laser irradiance can increase aggregate laser cost for an instrument, as well as increase the overall size of the instrument.

There is, therefore, a continuing need to increase the multiplexing capability of optical analytical systems for nucleic acid sequencing while at the same time decreasing the size and cost of such instruments.

BRIEF SUMMARY OF THE INVENTION

The present disclosure addresses these and other needs by providing optical analytical systems for nucleic acid sequencing comprising:
    a plurality of multiplexed optical chips, each multiplexed optical chip comprising;
        a plurality of reaction regions;
        at least one optical waveguide in optical connection with the plurality of reaction regions;
        an input optical coupler in optical connection with the at least one optical waveguide; and
        an optical detector in optical connection with the plurality of reaction regions;
    an optical source;
and
    a plurality of optical delivery devices in optical connection with the optical source, wherein at least one optical delivery device illuminates the input optical coupler of at least one multiplexed optical chip.

In some system embodiments, at least one optical delivery device outputs no more than two optical beams or no more than one optical beam, and/or at least one multiplexed optical chip comprises no more than two input optical couplers or no more than one input optical coupler, and/or the optical analytical system comprises at least two multiplexed optical chips, at least three multiplexed optical chips, at least four multiplexed optical chips, at least six multiplexed optical chips, or at least eight multiplexed optical chips, and/or the optical analytical system comprises at least two optical delivery devices, at least three optical delivery devices, at least four optical delivery devices, at least six optical delivery devices, or at least eight optical delivery devices.

In more specific embodiments, at least one multiplexed optical chip comprises at least 2, at least 5, at least 10, at least 50, at least 100, at least 500, at least 1,000, at least 5,000, at least 10,000, or at least 50,000 optical waveguides. In other more specific embodiments, at least one multiplexed optical chip comprises no more than 100,000, no more than 50,000, no more than 10,000, no more than 5,000, no more than 1,000, no more than 500, or no more than 100 optical waveguides. In still other more specific embodiments, at least one multiplexed optical chip comprises from 1 to 100,000, from 100 to 10,000, or from 500 to 5,000 optical waveguides.

In some more specific embodiments, at least one multiplexed optical chip comprises two input optical couplers, at least one optical waveguide comprises two ends, and the two input optical couplers are separately coupled to the two ends of the at least one optical waveguide. More specifically, the at least one optical waveguide is illuminated from each of the two ends with a counter-propagated light, or even more specifically, the counter-propagated light has a first wavelength and a second wavelength.

In some embodiments, at least one multiplexed optical chip comprises no more than one input optical coupler, and wherein the at least one optical delivery device illuminates the input optical coupler with a multi-mode optical beam. More specifically, the multi-mode optical beam is wavelength multiplexed, spatial-mode multiplexed, or polarization multiplexed. Even more specifically, the multi-mode optical beam is polarization multiplexed.

In embodiments, at least one optical delivery device outputs no more than one optical beam, for example wherein the optical source is a broadband, multi-longitudinal optical excitation source or the optical source is modulated in phase, frequency, or amplitude.

According to some embodiments, at least one optical delivery device and at least one multiplexed optical chip are optically aligned by measuring an optical signal from at least one reaction region, more specifically the optical analytical system is configured to move the at least one optical delivery device or the at least one multiplexed optical chip to increase the optical signal from the at least one reaction region, and even more specifically wherein the optical signal from the at least one reaction region is maximized.

In preferred embodiments, the optical analytical system does not comprise an alignment camera.

In some embodiments, at least one reaction region requires a power density of no more than 1.0 $\mu W/\mu m^2$, no more than 0.5 $\mu W/\mu m^2$, no more than 0.4 $\mu W/\mu m^2$, no more than 0.3 $\mu W/\mu m^2$, no more than 0.2 $\mu W/\mu m^2$, or no more than 0.1 $\mu W/\mu m^2$.

In some embodiments, the optical source comprises no more than four lasers, no more than two lasers, or no more than one laser. In more specific embodiments, the optical source comprises one laser outputting no more than 2000 mW at a wavelength from 450 nm to 700 nm, the optical source comprises one wavelength-tunable laser, outputting no more than 2000 mW at a wavelength from 450 nm to 700 nm, the optical source comprises two wavelength-tunable lasers, each laser outputting no more than 1000 mW at a wavelength from 450 nm to 700 nm, or the optical source is one non-tunable laser.

In some embodiments, the optical source provides light having no more than two wavelengths, more specifically, the optical source provides light having no more than one wavelength.

According to another aspect of the disclosure, the optical analytical systems further comprise a planar lightwave circuit optically coupled to the optical source and to at least one optical delivery device. In specific embodiments, the planar lightwave circuit comprises a plurality of optical channels, and the planar lightwave circuit controls optical switching between the plurality of optical channels, the planar lightwave circuit comprises a plurality of optical channels, and at least one optical channel comprises an active power control, for example a variable optical attenuator, the optical analytical system comprises at least two optical delivery devices, at least three optical delivery devices, at least four optical delivery devices, or at least six optical delivery devices, the optical analytical system comprises at least two multiplexed optical chips, at least three multiplexed optical chips, at least four multiplexed optical chips, or at least six multiplexed optical chips, or at least one multiplexed optical chip comprises no more than two input optical couplers or no more than one input optical couplers.

In other specific embodiments, the optical analytical system comprises two planar lightwave circuits optically coupled to the optical source and to the at least one optical delivery device. More specifically, the optical source provides a first optical wavelength to a first planar lightwave circuit and a second optical wavelength to a second planar lightwave circuit, for example, wherein the at least one optical delivery device is optically connected to both the first planar lightwave circuit and the second planar lightwave circuit, wherein the optical source comprises two wavelength-tunable lasers, or wherein the optical source comprises one wavelength-tunable laser and optionally wherein the optical source further comprises a fast optical switch.

In some system embodiments, the at least one optical waveguide is configured to minimize loss of power of an input optical signal at the plurality of reaction regions. More specifically in these embodiments, the at least one optical waveguide has a wedged shape, the at least one optical waveguide is slanted relative to a row of reaction regions on at least one multiplexed optical chip, or the at least one optical waveguide is a routing waveguide that bisects at least one multiplexed optical chip.

According to another aspect of the disclosure, at least one optical delivery device in the optical analytical systems is a small form factor optical delivery device. More specifically, the optical source can be a modular optical source, such as a laser diode, integrated into the small form factor optical delivery device. In other specific embodiments, the input optical coupler of the at least one multiplexed optical chip can have a numerical aperture of at least 0.4, at least 0.6, at least 0.8, at least 0.10, at least 0.125, or at least 0.25.

In some embodiments, the at least one multiplexed optical chip comprises no more than one input optical coupler or no more than two input optical couplers, the plurality of multiplexed optical chips are packaged together, such as on a single substrate, or even on a printed circuit board, or the optical analytical system further comprises a high bandwidth serial path connecting a datastream from at least one multiplexed optical chip. In more specific embodiments, the optical analytical system further comprises a data processing or computational element in optical connection with the optical detector. Even more specifically, the data processing or computational element is located at a distance from the plurality of multiplexed optical chips, the optical source, or at least one optical delivery device.

In some embodiments, at least one optical delivery device comprises an actuator element, more specifically a swing-arm element. Even more specifically, the swing-arm element comprises a tracking coil, a focusing coil, or a hinge spring.

In some embodiments, the input optical coupler of at least one multiplexed optical chip has a numerical aperture of at least 0.4, at least 0.6, at least 0.8, at least 0.10, at least 0.125, or at least 0.25.

According to another aspect of the disclosure, at least one multiplexed optical chip in the optical analytical systems comprises an edge coupler. In specific embodiments, the edge coupler is a beam expander coupler or a transparent rib index waveguide. In other specific embodiments, at least one multiplexed optical chip comprises a metallic surface layer comprising an array of zero mode waveguides, and the edge coupler is positioned below the metallic surface layer. In still other specific embodiments, the optical source is a glass fiber or a laser diode.

According to another aspect of the disclosure, the optical analytical systems comprise a computer that receives at least one electronic signal from the optical detector of the at least one multiplexed optical chip and that analyzes the at least one electronic signal. More specifically, the at least one electronic signal provides nucleic acid sequence information. According to still other aspects of the disclosed optical analytical systems, the optical source has a wavelength of excitation from about 450 nm to about 700 nm or from about 500 nm to about 650 nm, at least one multiplexed optical chip is fabricated on a silicon chip, the optical detector of at least one multiplexed optical chip comprises a CMOS sensor, and/or the plurality of reaction regions of at least one multiplexed optical chip comprise a plurality of nucleic acid samples.

BRIEF DESCRIPTION OF THE FIGURES

In FIG. 12A, all of the optical delivery devices are aligned with input couplers on the four chips, whereas in FIG. 12B, the lower two optical delivery devices are positioned for unloading the chips.

FIGS. 14A-14E outline an exemplary process flow for fabrication of an exemplary edge coupler.

DETAILED DESCRIPTION OF THE INVENTION

Systems Comprising Waveguide-Addressed Integrated Analytical Devices

Figure 1:
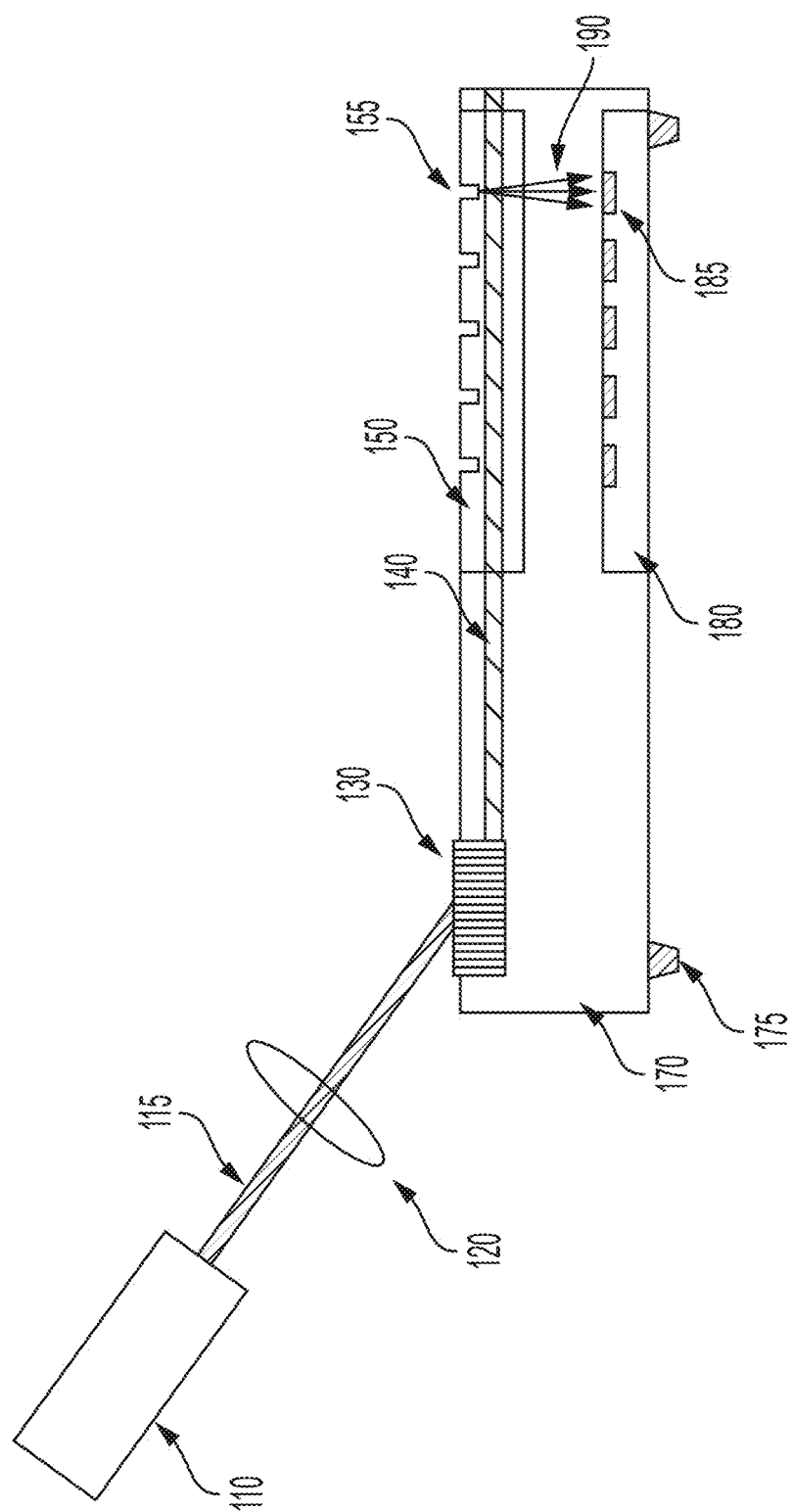
FIG. 1 shows an analytical system comprising an optical source and a target optical waveguide device.

By way of introduction, an exemplary optical analytical system comprising a single optical delivery device and a single integrated target waveguide device is illustrated in FIG. 1. In this system, the optical delivery device 110 emits an illumination beam 115, also referred to as an optical excitation signal or optical excitation beam, into free space. The optical delivery device 110 can be coupled to or include, for example, a laser source, a light-emitting diode, a semi-conductor laser diode, or any other suitable device for generating optical energy having the desired optical characteristics, and it can include, for example, one or more other optical elements through which the light travels prior to being emitted into free space. For example, the other optical elements can include one or more optical fibers, planar lightwave circuits (PLCs), or any combination of these or other optical elements, prior to emission of the illumination beam 115 into free space. In addition, the illumination beam 115 can optionally pass through one or more optical elements 120 which are used to shape, steer, or otherwise control the properties of the illumination light prior to reaching the target.

The illumination beam, having optionally been shaped and/or steered by the one or more optical elements 120, is then coupled into an optical waveguide 140 on or in a target device 170, which may also be referred to herein as a "multiplexed optical chip" or "sequencing chip". The coupled light is transmitted through the optical waveguide to an area of interest 150 on the target device. Typically, and as shown here, an optical coupler 130, such as a grating coupler, is used to launch the illumination light into the optical waveguide. While a grating coupler is shown, it is to be understood that any type of coupler, prism, or other interface, optical element, or method, including, for example, an edge coupler or direct butt-coupling, can be used to direct an optical excitation signal from an optical source and delivery device into the optical waveguide on the target device.

The area of interest 150, which in the case of a nucleic acid sequencing device may also be referred to as a "sequencing area" or "sequencing region", has a plurality of reaction regions 155, for example nanowells or zero mode waveguides (ZMWs), arrayed within the area of interest. The optical waveguide 140 typically extends underneath the reaction regions 155, thereby illuminating the reaction regions from below by optical coupling with evanescent wave illumination. In other words, the optical waveguide is in optical connection with the reaction regions, in this case on the surface of the target device. The reaction regions preferably contain fluorescent reactants, which, when excited by the evanescent wave illumination, emit fluorescent light 190, which can be detected in order to carry out a desired analysis (e.g., nucleic acid sequencing). In some cases, and as shown here, the target device also has an integrated sensor 180, which is also referred to as an optical detector. The emitted fluorescent light from the reaction regions is optically coupled through the device to be detected at a single pixel or group of pixels 185 within the optical detector. In other words, the optical detector is in optical connection with the plurality of reaction regions.

Target devices that include integrated optical detectors will also typically include an electronic output 175. For example, the integrated optical detector detects and processes an optical emission signal, and then sends electronic data related to the detected signals out of the device through an electronic output or outputs. The electronic outputs can, for example, be bond pads on a silicon chip, which are typically wire bonded to a chip package, and the chip package will have electronic outputs for passing on the electronic signals from the chip. The electronic signals are typically sent to a computer (not shown), which processes the received signals to perform the desired analysis.

The optical waveguide on the target device can be any suitable waveguide including a fiber, a planar waveguide, or a channel waveguide. Typically, channel waveguides are used. The waveguide is preferably a single mode waveguide, but it can be a multi-mode waveguide for some applications. The dimensions of the optical waveguide and the refractive index of the materials used to fabricate the optical waveguide are chosen based on the optical source and the desired optical properties, as is understood by those of ordinary skill in the art.

As mentioned above, the sequencing area comprises plurality of reaction regions 155, for example nanowells or zero mode waveguides (ZMWs), arrayed within the area of interest. The reaction regions are in optical connection with at least one optical waveguide, which provides excitation illumination, and with an optical detector, that is typically physically integrated with the target device, and that detects light emitted from the reaction regions. The target device, or "multiplexed optical chip", can optionally contain further optical components, fluidic components, electrical components, and/or mechanical components. Integration of some or all of these components into a single, miniaturized device can address many of the problems facing larger, non-integrated analytical systems, such as size, cost, weight, inefficiencies associated with long-path or free-space optics, and the like. Exemplary highly multiplexed integrated devices and systems for the analysis of nanoscale samples are described in U.S. Patent Publication Nos. 2008/0128627, 2012/0014837, 2012/0019828, 2012/0021525, 2012/0085894, 2014/0199016, 2014/0287964, 2016/0334334, 2016/0363728, 2016/0273034, 2016/0061740, and 2017/0145498, which are each incorporated herein by reference in their entireties.

By integrating the detection elements with the reaction regions, either directly or as a coupled part, the need for many of the various components required for free-space optical systems, such as much of the conveying optics, lenses, mirrors, and the like, can be eliminated. Other optical components, such as various alignment functionalities, can also in many cases be eliminated, as alignment can be achieved through the direct integration of the detection elements with the reaction regions. The optical analytical systems of the present disclosure further improve the benefits afforded by such multiplexed devices by vastly increasing the multiplicity of the optical systems, by simplifying the interactions between the multiplexed optical chips and the optical sources used to illuminate them, and by improving their efficiency and reliability.

Figure 2:
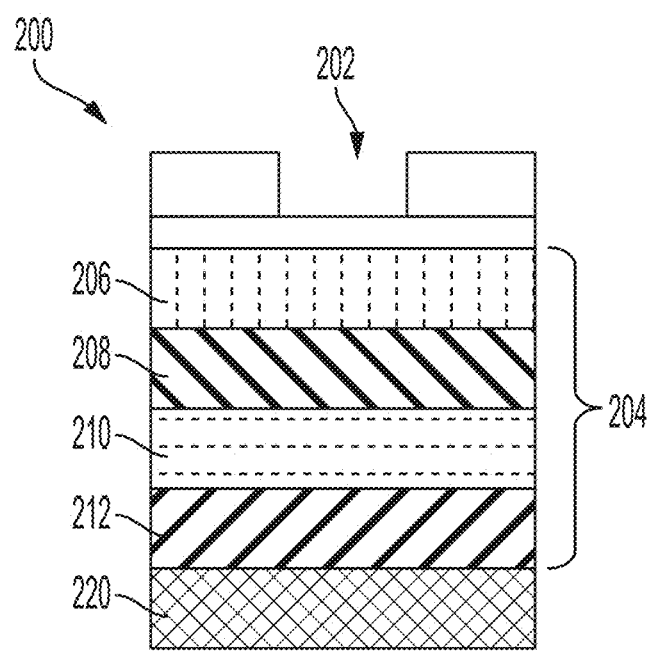
FIG. 2 shows a block diagram of an integrated analytical device.

While the components within an array of nanoscale integrated analytical devices can vary, each unit cell within the array typically comprises, at least in part, the general structure shown as a block diagram in FIG. 2. As shown, an integrated analytical device 200 typically includes a reaction cell 202, in which the reactants are disposed and from which the optical emission signals emanate. "Reaction cell" is to be understood as generally used in the analytical and chemical arts and refers to the location where the reaction of interest is occurring. Thus, "reaction cell" can include a fully self-contained reaction well, vessel, flow cell, chamber, or the like, e.g., enclosed by one or more structural barriers, walls, lids, and the like, or it can comprise a particular region on a substrate and/or within a given reaction well, vessel, flow cell or the like, e.g., without structural confinement or containment between adjacent reaction cells. The reaction cell can include structural elements to enhance the reaction or its analysis, such as optical confinement structures, nanowells, posts, surface treatments, such as hydrophobic or hydrophilic regions, binding regions, or the like.

In various respects, "analytical device", "integrated analytical device", or "unit cell" refers to a reaction cell and associated components that are functionally connected. A multiplexed sequencing chip therefore comprises an array of the above-described integrated analytical devices. In various respects, "analytical system" refers to the larger system including the array of integrated analytical devices on the sequencing chip and other components for performing an analysis operation. The sequencing chip is preferably removably coupled into the instrument. Liquid samples and/or reagents can be brought into contact with the sequencing chip before or after the sequencing chip is coupled with the system. The system can provide electronic signals and/or illumination light to the sequencing chip and can receive electronic signals from the detectors or other electronic components in the sequencing chip. The system can also provide mechanical support for and/or thermal exchange with the sequencing chip. The instrument or system can have computers to manipulate, store, and analyze the data from the sequencing chip. For example, the instrument can have the capability of identifying the order of added nucleotide analogs in a nucleic acid sequencing reaction. The identification can be carried out, for example, as described in U.S. Pat. No. 8,182,993, which is incorporated herein by reference for all purposes.

In some cases, one or more reactants involved in the reaction of interest can be immobilized, entrained, or otherwise localized within a given reaction cell. A wide variety of techniques are available for localization and/or immobilization of reactants, including surface immobilization through covalent or non-covalent attachment, bead or particle based immobilization, followed by localization of the bead or particle, entrainment in a matrix at a given location, and the like. Reaction cells can include ensembles of molecules, such as solutions, or patches of molecules, or they can include individual molecular reaction complexes, e.g., one molecule of each molecule involved in the reaction of interest as a complex. Similarly, the multiplexed optical chips of the disclosure can include individual reaction cells or can comprise collections, arrays, or other groupings of reaction cells in an integrated structure, e.g., a multiwall or multi-cell plate, chip, substrate, or system. Some examples of such arrayed reaction cells include nucleic acid array chips, e.g., GeneChip® arrays (Affymetrix, Inc.), zero mode waveguide arrays (as described elsewhere herein), microwell and nanowell plates, multichannel microfluidic devices, e.g., LabChip® devices (Caliper Life Sciences, Inc.), and any of a variety of other reaction cells. In various respects, the "reaction cell", sequencing layer, and zero mode waveguides are similar to those described in U.S. Pat. No. 7,486,865, the entire contents of which is incorporated herein by reference for all purposes. In some cases, these arrayed devices can share optical components within a single integrated overall device, e.g., a single waveguide layer to deliver excitation light to each reaction region. Approaches to illuminating analytical devices with waveguides are provided, for example, in U.S. Pat. Nos. 8,207,509 and 8,274,040, and in U.S. Patent Publication Nos. 2014/0199016 and 2014/0287964, which were previously incorporated by reference.

Although an analytical system may include an array of analytical devices having a single waveguide layer and reaction cell layer, it can be appreciated that a wide variety of layer compositions can be employed in the waveguide array substrate and cladding/reaction cell layer while still achieving the goals of the device (see, e.g., U.S. Pat. No. 7,820,983, incorporated herein by reference for all purposes).

The multiplexed optical chips of the instant disclosure typically include an arrayed plurality of analytical devices 200, as illustrated in FIG. 2, having a detector element 220, which is disposed in optical communication with the reaction well 202. Optical communication between the reaction well 202 and the detector element 220 can be provided by an optical train 204 comprised of one or more optical elements generally designated 206, 208, 210 and 212 for efficiently directing the signal from the reaction well 202 to the detector element 220. These optical elements can generally comprise any number of elements, such as lenses, filters, gratings, mirrors, prisms, refractive material, or the like, or various combinations of these, depending upon the specifics of the application. In addition to components for directing the optical emission signal from the reaction region to the detector, the chip can also have optical components for delivering illumination light to the reaction regions for performing fluorescent measurements.

In various embodiments, the reaction well 202 and detector element 220 are provided along with one or more optical elements in an integrated device structure. By integrating these elements into a single device architecture, the efficiency of the optical coupling between the reaction cell and the detector can be improved. As used herein, the term integrated, when referring to different components of an analytical device typically refers to two or more components that are coupled to each other so as to be immobile relative to each other. As such, integrated components can be irreversibly or permanently integrated, meaning that separation would damage or destroy one or both elements, or they can be removably integrated, where one component can be detached from the other component, provided that when they are integrated, they are maintained substantially immobile relative to one another. In some cases, the components are integrated together, for example as a single fabricated device, such as in a single silicon chip. In some cases, the detector portion is part of a separate structural component or device, such as a CMOS device, and the reaction cell component is part of a detachable device, such as a detachable chip. In the case where the reaction cell component is in a chip separate from the detector component, optical element components for directing the optical emission signal from the reaction cell to the detector can be in either the reaction cell component, in the detector component, or a combination in which some components are in the reaction cell component and others are in the detector component.

In conventional optical analytical systems, discrete reaction vessels are typically placed into optical instruments that utilize only free-space optics to convey the optical signals to and from the reaction vessel and to the detector. These free space optics tend to include larger components, multiple surfaces, and longer optical path lengths, and have free space interfaces that contribute to a number of weaknesses for such systems. For example, such systems have a propensity for greater losses of light given the introduction of unwanted leakage paths from these larger components. They also typically introduce higher levels of auto-fluorescence. All of these inherent weaknesses reduce the signal-to-noise ratio (SNR) of the system and reduce its overall sensitivity, which, in turn can impact the speed, accuracy, and throughput of the system. Additionally, in multiplexed applications, signals from multiple reaction regions (i.e., multiple reaction cells, or multiple reaction locations within individual cells), are typically passed through a common optical train, or common portions of an optical train, using the full volume of the optical elements in that train to be imaged onto the detector plane. As a result, the presence of optical aberrations in these optical components, such as diffraction, scattering, astigmatism, and coma, degrade the signal in both amplitude and across the field of view, resulting in greater noise contributions and cross talk among detected signals.

In some cases, the reaction region of the instant multiplexed optical chips comprises a nanoscale well, for example, a nanoscale well having no linear dimension of greater than 500 nm. A nanoscale well of the optical chips of the disclosure can, for example, be cylindrical with a base diameter between about 50 nm and 200 nm. The depth of the well can, for example, be from about 50 nm to about 400 nm. In some cases, the reaction regions can comprise zero mode waveguides (ZMWs). Zero mode waveguides are described, for example, in U.S. Pat. Nos. 717,050, 7,486,865, and 8,501,406 which are each incorporated herein by reference in their entireties.

Such devices have sought to take advantage of the proximity of the reaction region or vessel in which signal producing reactions are occurring, to the detector or detector element(s) that sense those signals, in order to take advantage of benefits presented by that proximity. As alluded to above, such benefits include the reduction of size, weight, and complexity of the optical train, and as a result, increase the potential multiplex of a system, e.g., the number of different reaction regions that can be integrated and detected in a single sequencing chip or system. Additionally, such proximity potentially provides benefits of reduced losses during signal transmission, reduced signal cross-talk from neighboring reaction regions, and reduced costs of overall systems that utilize such integrated devices, as compared to systems that utilize large free space optics and multiple cameras in signal collection and detection.

In the multiplexed optical systems of the present disclosure, there are a number of design criteria that can benefit from optimization. For example, in these optical systems, an important goal is in the minimization of the number of optical elements in the light train that could interfere with the efficient transmission of optical emission signals from the reaction region to the detector, as well as contribute to increased costs and space requirements for the device, by increasing the complexity of the optical elements between the reaction regions and the sensors.

Additionally, and with added importance for single molecule detection systems, it is also important to maximize the amount of optical emission signal that is detected for any given reaction event. In particular, in optical detection of individual molecular events, a relatively small number of photons corresponding to the event of interest are typically relied on in the measurements. While high quantum yield labeling groups, such as fluorescent dyes, can improve detectability, such systems still operate at the lower end of detectability of optical systems. Fluorescent dyes finding utility in the analytical reactions performed using the instant systems are well known. Any suitable fluorescent dye can be used, for example, as described in PCT International Publication Nos. WO2013/173844A1, WO2017/087973A1, WO2017/087974A1, and WO2017/087975, and U.S. Patent Publication Nos. 2009/0208957A1, 2010/0255488A1, 2012/0052506A1, 2012/0058469A1, 2012/0058473A1, 2012/0058482A1, and 2012/0077189A1.

In the context of the optical analytical systems of the present disclosure, the size and complexity of the optical pathways poses a greater difficulty, as there is less available space in which to accomplish the goals of separation of excitation and signal, or separation of one signal from the next. Accordingly, the multiplexed optical chips of the instant systems take advantage of simplified optical paths associated with the analyses being carried out, in order to optimize those analyses for the integrated nature of those optical chips.

Figure 3:
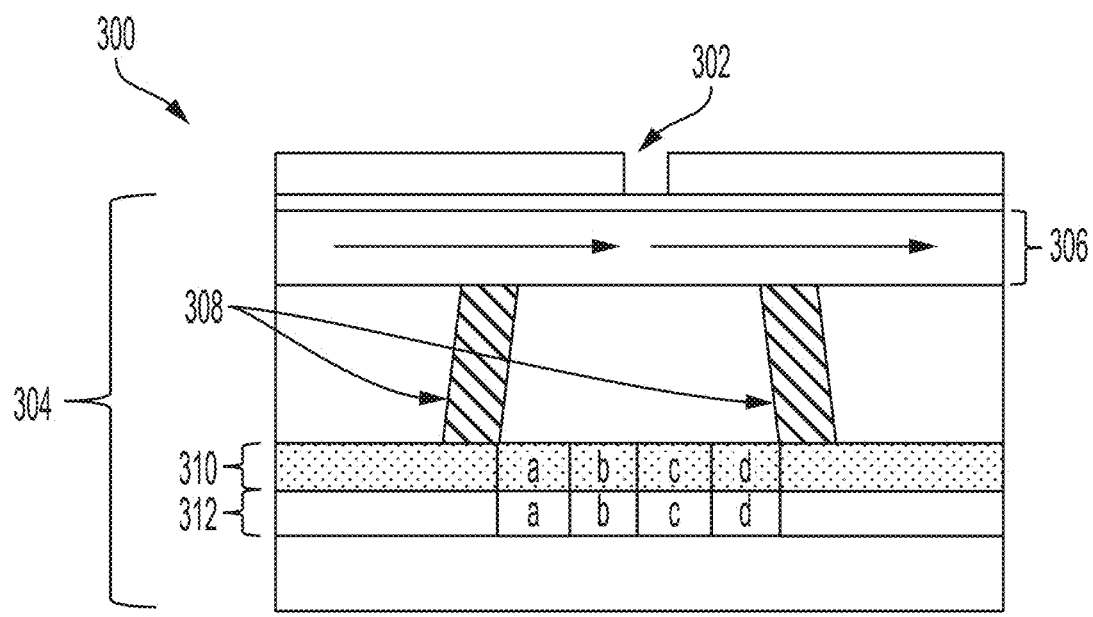
FIG. 3 shows a more detailed view of an exemplary device architecture for performing fluorescence analyses.

FIG. 3 illustrates in more detail an example of a unit cell device architecture for performing optical analyses, e.g., nucleic acid sequencing processes or single molecule binding assay. As shown, an integrated device 300 includes a reaction well 302 that is defined upon a first substrate layer 304. As shown, the reaction well 302 is disposed in the substrate surface. Such wells may constitute depressions in a substrate surface or apertures disposed through additional substrate layers to an underlying transparent substrate, e.g., as used in zero mode waveguide arrays (see, e.g., U.S. Pat. Nos. 7,181,122 and 7,907,800). FIG. 3 illustrates a portion of a device having one reaction well 302. Typically, a device will have multiple reaction regions, for example a device can comprise arrays with thousands, to millions, to tens of millions, or even more individual reaction wells.

Excitation illumination is delivered to the reaction well from an excitation light source (not shown) that may be separate from or may be integrated into the optical device. As shown, an optical waveguide (or waveguide layer) 306 is used to convey excitation light (shown by arrows) to the vicinity of reaction well 302, where an evanescent field emanating from the waveguide 306 illuminates reactants within the reaction well 302. Use of optical waveguides to illuminate reaction wells is described in e.g., U.S. Pat. Nos. 7,820,983, 8,207,509, and 8,274,040, which are each incorporated herein by reference for all purposes.

The integrated device 300 optionally includes light channeling components 308 to efficiently direct emitted light from the reaction well to a detector layer 312 disposed beneath the reaction well. The detector layer will typically comprise multiple detector elements, for example the four illustrated detector elements 312a-d that are optically coupled to a given reaction well 302. For DNA sequencing applications, it is often desirable to monitor four different signals in real time, each signal corresponding to one of the nucleobases. The different signals can be distinguishable, for example, by wavelength, intensity, or any other suitable distinction, or combination of distinctions. Although illustrated as a linear arrangement of pixels 312a-d, it will be appreciated that the detector elements can be arranged in a grid, n by n square, annular array, or any other convenient orientation or arrangement. In some cases, each of the detector elements or channels will have a single pixel per reaction region, wherein the different analytical signals may be distinguishable by, for example, their different intensities. In some cases, the detector elements will each comprise multiple pixels, for example two, three, four, or even more pixels per reaction region. The detector elements are connected electronically to conductors that extend out of the chip for providing electronic signals to the detector elements and for sending out signals from the detector elements, for example to an attached processor. In some embodiments, the detector layer is a CMOS wafer or the like, i.e., a wafer made up of CMOS sensors or CCD arrays. See, for example, *CMOS Imagers From Phototransduction to Image Processing* (2004) Yadid-Pecht and Etienne-Cummings, eds.; Springer; *CMOS/CCD Sensors and Camera Systems* (2007) Holst and Lomheim; SPIE Press.

Emitted signals from the reaction well 302 that impinge on these detector elements are then detected and recorded. As illustrated in the integrated device of FIG. 3, the device may additionally include a color filter above each of the detector element, as disposed, for example, in filter layer 310. As shown in the drawing, "filter a" corresponds to the color filter associated with "channel a", "filter b" corresponds to the color filter associated with "channel b", and so forth. The set of filters is chosen to allow for a high yield of captured photons, for example with each color filter having one or more blocking bands that block the signal from a portion of one or more of the spectrally distinct signals emitted from the reaction occurring in reaction well 302. Specifically, the filters are designed to allow passage of a large percentage of the emitted photons, while still discriminating between the four bases. Where emitted signals are distinguished by their intensity, a single detector element may be able to identify multiple signals, for example signals emitted by multiple different nucleobases, by differences in optical intensity emitted from the reaction region by the sample at one wavelength or range of wavelengths.

In some cases, optical elements are provided to selectively direct light from given sets of wavelengths to given detector elements. Typically, no specific light re-direction is used, such that the light reaching each region of the filter layer is substantially the same.

The detector layer is operably coupled to an appropriate circuitry, typically integrated into the substrate, for providing a signal response to a processor that is optionally integrated within the same device structure or is separate from but electronically coupled to the detector layer and associated circuitry. Examples of the types of circuitry useful in such devices are described in U.S. Patent Publication No. 2012/0019828, previously incorporated by reference herein.

The multiplexed optical chips of the instant disclosure, which may also be referred to herein as target waveguide devices, target devices, or integrated analytical devices, typically have at least one input optical coupler and an integrated waveguide that is optically coupled to the input optical coupler and that delivers an input optical signal to the plurality of reaction regions. In some embodiments, the input optical coupler is a diffraction grating coupler or an edge coupler. In some embodiment, an optical source is directed through an optical delivery device to a single input coupler, while in other cases, the optical source is directed to multiple input couplers, for example from 2 to 16 input couplers. In some embodiments, each input coupler receives substantially the same power. In some embodiments, different power levels are directed to different input couplers on the target device or on different target devices. While this description may refer to "the coupler" or "the input coupler" on a device, it is understood that in some embodiments there can be a single input coupler, and that in other embodiments, there will be a plurality of input couplers on a given device.

Grating couplers and their use in coupling light, typically light from optical fibers, to waveguide devices are known in the art. For example, U.S. Pat. No. 3,674,335 discloses reflection and transmission grating couplers suitable for routing light into a thin film waveguide. In addition, U.S. Pat. No. 7,245,803 discloses improved grating couplers comprising a plurality of elongate scattering elements. The couplers preferably have a flared structure with a narrow end and a wide end. The structures are said to provide enhanced efficiency in coupling optical signals in and out of planar waveguide structures. U.S. Pat. No. 7,194,166 discloses waveguide grating couplers suitable for coupling wavelength division multiplexed light to and from single mode and multimode optical fibers. The disclosed devices include a group of waveguide grating couplers disposed on a surface that are all illuminated by a spot of light from the fiber. At least one grating coupler within the group of couplers is tuned to each channel in the light beam, and the group of couplers thus demultiplexes the channels propagating in the fiber. Additional examples of grating couplers are disclosed in U.S. Pat. No. 7,792,402 and PCT International Publication Nos. WO 2011/126718 and WO 2013/037900. A combination of prism coupling and grating coupling into an integrated waveguide device is disclosed in U.S. Pat. No. 758,261.

In the multiplexed optical chips of the instant systems, optical energy can be provided from any suitable optical delivery device or devices. Such devices may comprise fibers, lenses, prisms, mirrors, splitters, or any other suitable optical component, as would be understood by those of ordinary skill in the art. The optical delivery device may be coupled to, or include, one or more planar lightwave circuits (PLCs). Exemplary optical delivery devices are disclosed in U.S. Patent Publication No. 2016/0273034. Where the optical delivery device delivers multiple optical beams to a target device, the device may be referred to as a "light brush". In some embodiments, such a light brush can deliver at least 2 optical beams, at least 3 optical beams, at least 4 optical beams, at least 6 optical beams, at least optical 8 beams, or even more optical beams. In some embodiments, such a light brush can deliver no more than 8 optical beams, no more than 6 optical beams, no more than 4 optical beams, no more than 3 optical beams, or even no more than 2 optical beams. In preferred embodiments, the optical delivery device can deliver either two optical beams or one optical beam to a target device. Where the optical delivery device delivers two optical beams to a target device, the device may be referred to as a "light fork", and where the optical delivery device delivers a single optical beam to a target device, the device may be referred to as a "light pen".

Optical energy can be provided to the optical delivery device by any suitable optical source, as would be understood by those of ordinary skill in the relevant art. Optical sources that emit in the visible wavelength range are particularly useful for the analytical systems of the present disclosure, for example, optical sources that emit between 450 nm and 700 nm or from 500 nm to 650 nm. In some embodiments, the instant systems can include more than one optical source.

In some embodiments, the optical source is a multi-mode optical source. More specifically, the multi-mode optical source can be a wavelength multiplexed, a spatial-mode multiplexed, or a polarization multiplexed optical source. Even more specifically, the multi-mode optical source can be a polarization multiplexed optical source.

In preferred embodiments, the optical source is a laser source. Any suitable type of laser can be used for the instant systems. In some cases, solid state lasers are used, for example, III-V semiconductor lasers. Recently, progress has been made in producing solid state lasers that emit in the desired wavelength range. Particularly useful lasers are GaInN solid state lasers. Lasers suitable for use in the disclosed systems, including GaInN lasers, are described, for example in Sizov et al., "Gallium Indium Nitride-Based Green Lasers," *J. Lightwave Technol.*, 30, 679-699 (Mar. 1, 2012), Nakamura, et al. "Current Status and Future Prospects of InGaN-Based Laser Diodes", *JSAP Int. No.* 1, January 2000, Jeong et al. *Nature*, Scientific Reports, "Indium gallium nitride-based ultraviolet, blue, and green light emitting diodes functionalized with shallow periodic hole patterns", DOI: 10.1038, and Tagaki et al., "High-Power and High-Efficiency True Green Laser Diodes", *SEI Tech Rev, No.* 77, October 2013; which are each incorporated by reference herein for all purposes in their entireties.

In some embodiments, the optical source is a light emitting diode, for example a superluminescent light emitting diode. In some embodiments, the optical source is a vertical-cavity surface-emitting laser, or other comparable optical device. Where the optical source is a small format, modular device, such as a light emitting diode or the like, the source itself can also be considered to be an optical delivery device for purposes of the instant analytical optical systems.

In the multiplexed optical chips of the instant disclosure, there can be a significant distance between the input optical coupler and the area of interest, e.g., the reaction regions, as described above. The distance that the light travels in the waveguide from the input optical coupler to an area of interest can be, for example, several centimeters, for example from 1 cm to 10 cm. The distance referred to herein is the distance the light travels within the waveguide, e.g., the routing distance of the light through the waveguide or waveguides. Typically, where light is routed from a coupler over relatively long distances to an area of interest, a single waveguide is used to route the light from the input coupler to a region close to the area of interest, where splitting of the routing waveguide into multiple waveguides can occur. Where multiple waveguide branches are desired within the area of interest, the splitting from a routing waveguide to waveguide branches in the area of interest is typically carried out near the area of interest rather than near the input coupler, although in some embodiments, it can be advantageous for the splitting to occur nearer to the input coupler, in particular where link efficiency variation is a problem, for example as described in U.S. Patent Publication No. 2016/0216538. One routing waveguide per coupler is typically the most area-efficient approach for routing over relatively long distances. Using one routing waveguide involves fewer elements and typically uses less space on the device than when multiple routing waveguides per coupler are used.

The multiplexed optical chips of the instant disclosure advantageously comprise a plurality of optical waveguides, the optical waveguides configured to receive an optical excitation beam from the at least one input optical coupler. For example, a multiplexed optical chip can comprise at least 2, at least 5, at least 10, at least 50, at least 100, at least 500, at least 1,000, at least 5,000, at least 10,000, or at least 50,000 optical waveguides. In some embodiments, the chip can comprise no more than 100,000, no more than 50,000, no more than 10,000, no more than 5,000, no more than 1,000, no more than 500, or no more than 100 optical waveguides. In other embodiments, the chip can comprise from 1 to 100,000, from 100 to 10,000, or from 500 to 5,000 optical waveguides.

In some embodiments, the multiplexed optical chips of the disclosure comprise at least one optical splitter, wherein the at least one optical splitter comprises an optical input and a plurality of optical outputs, and wherein the optical input of the at least one optical splitter is configured to receive an optical excitation beam from the input optical coupler. Such devices also typically comprise a plurality of optical waveguides, the optical waveguides configured to receive the optical excitation beams from the plurality of optical outputs of the at least one optical splitter.

In some embodiments, the multiplexed optical chips of the instant disclosure comprise no more than one input optical coupler for providing illumination light to the reaction regions. In other embodiments, the multiplexed optical chips of the disclosure comprise no more than two input optical couplers for providing illumination light to the reaction regions.

For purposes of counter-propagation of light through the waveguides of the instant multiplexed optical chips, and as will be described in more detail below, the chips can comprise at least one optical waveguide with two ends, and light can be separately provided to the two ends of the optical waveguide, i.e., by counter-propagation. In some embodiments, for example where the counter-propagation is self-counter-propagation, the two ends of the optical waveguide can be coupled to a single input optical coupler on the multiplexed optical chip.

In addition to the number of waveguides, the number of reaction regions per sequencing waveguide can be varied in order to obtain the desired level of multiplexing and performance. For example, the number of reaction regions per waveguide can be, for example, from 1 to 100,000 reaction regions, from 100 to 10,000 reaction regions, or from 500 to 5,000 reaction regions for each waveguide of the chip. Those of skill in the art will understand how to set these numbers in order to obtain the desired performance and level of multiplex.

In some embodiments, the systems of the instant disclosure further comprise a computer that receives at least one electronic signal from an optical detector, or region of an optical detector, for example the detected signals described above, and that analyzes the at least one electronic signal. More specifically, the analysis performed by the computer can comprise obtaining nucleic acid sequencing information from the electronic signal.

Nucleic Acid Sequencing

As is understood by those of ordinary skill in the art, fluorescently labeled nucleotides are used in a wide variety of different nucleic acid sequencing analyses. For example, in some cases such labels are used to monitor the polymerase-mediated, template-dependent incorporation of nucleotides in a primer extension reaction. In particular, a labeled nucleotide can be introduced to a primer template polymerase complex, and incorporation of the labeled nucleotide into the primer can be detected. If a particular type of nucleotide is incorporated at a given position, it is indicative of the underlying and complementary nucleotide in the sequence of the template molecule.

In particularly elegant sequencing approaches, labeled nucleotides are detected during the incorporation process itself, in real time, by individual molecular complexes. Such methods are described, for example, in U.S. Pat. No. 756,661, which is incorporated herein by reference in its entirety for all purposes. In these methods, nucleotides are labeled on a terminal phosphate group that is released during the incorporation process, so as to avoid the accumulation of labels on the extension product, and accordingly to avoid any need for label removal processes that can potentially be deleterious to the complexes. Primer/template polymerase complexes are observed during the polymerization process, and nucleotides being added are detected by virtue of their associated labels.

In one particular example, labeled nucleotides can be observed using an optically confined structure, such as a zero mode waveguide (see, e.g., U.S. Pat. No. 6,917,726, which is incorporated herein by reference in its entirety for all purposes) that limits exposure of the excitation radiation to the volume immediately surrounding an individual primer/template polymerase complex. As a result, only labeled nucleotides that are retained by the polymerase during the process of being incorporated are exposed to excitation illumination for a time that is sufficient to generate fluorescence and thus to identify the incorporated nucleotide. Exemplary chips having arrays of nanoscale wells or zero mode waveguides and that are therefore considered suitable for these purposes include substrates having a metal or metal oxide layer on a silica-based layer, with nanoscale wells disposed through the metal or metal oxide layer to, or into, the silica-based layer (see, e.g., U.S. Pat. Nos. 6,917,726, 7,302,146, 7,907,800, 8,802,600, 8,906,670, 8,993,307, 8,994,946, 9,223,084, 9,372,308, and 9,624,540, which are each incorporated herein by reference in their entireties).

In the various exemplary processes described above, detection of a signal event from a reaction region is indicative that a reaction has occurred. Further, with respect to many of the above processes, identification of the nature of the reaction, e.g., which nucleotide was added in a primer extension reaction at a given time or that is complementary to a given position in a template molecule, is also achieved by distinguishing the spectroscopic characteristics of the signal event.

The optical paths of the multiplexed optical chips of the disclosure serve one or more roles of delivering excitation radiation to the reaction region, e.g., to excite fluorescently-labeled molecules that then emit the relevant optical emission signal, conveying the optical signal emitted from the reaction region to the optical detector, and, for multispectral signals, i.e., multiple signals that may be distinguished by their emission spectrum, separating those signals so that they may be differentially detected, e.g., by directing different signals to different optical detectors or different regions on the same optical detector array. The differentially detected signals are then correlated with both the occurrence of the reaction, e.g., a nucleotide was added at a given position, and the determination of the nature of the reaction, e.g., the added nucleotide is identified as a particular nucleotide type, such as adenosine.

Highly Multiplexed Systems for Nucleic Acid Sequencing

The instant disclosure overcomes some of the problems associated with increasing the multiplex of nucleic acid sequencing reactions in existing systems by providing, in one aspect, optical analytical systems comprising multiple optical chips that are illuminated in parallel by multiple optical beams.

In particular, and as mentioned above, there are limits to the level of multiplex achievable on current integrated nucleic acid sequencing chips simply by increasing the number of reaction wells on a chip, for example, either by expanding the overall surface area of the chip, e.g., with the same sized reaction unit cell, or by decreasing the crosssectional size of the individual reaction unit cell, e.g., with the same sized chip. At the same time, increasing the level of multiplex for nucleic acid sequencing simply by a brute-force increase in the number of sequencing instruments used, does not provide any cost advantages or significant efficiencies of scale.

Improved Illumination Architectures

The instant inventors have discovered that increased throughput can be achieved, in at least some respects, through the use of a single optical analytical system that comprises multiple multiplexed optical chips, each of which can have decreased power requirements and/or simplified optical inputs compared to previous versions of the chips.

By way of comparison, the multiplexed waveguide devices described in U.S. Patent Publication No. 2016/0061740, and employed in the optically coupled analytical systems of U.S. Patent Publication Nos. 2016/0273034 and 2016/0363728 (all of which were previously incorporated by reference herein), typically require approximately 1 $\mu W/\mu m^2$ at each reaction region for illumination. As will be described in more detail below, the use of optical chips with lower input illumination requirements enables an increase in multiplex through the use of multiple chips within a single optical analytical system.

Figure 4A:
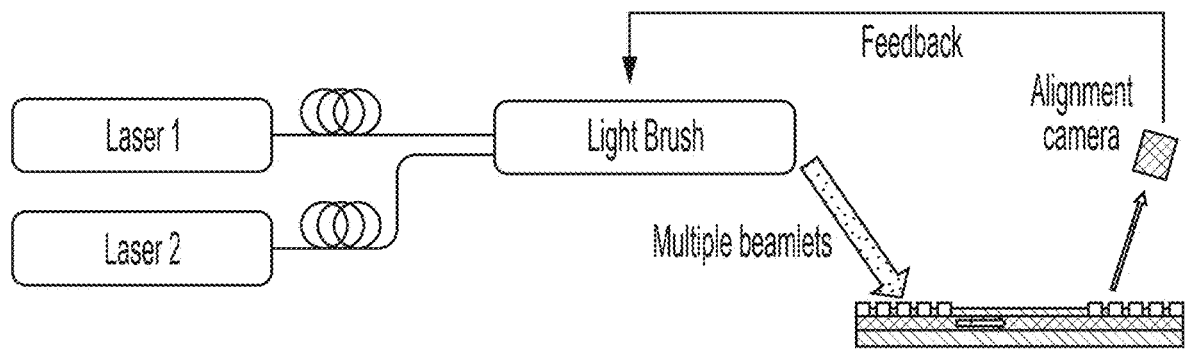
FIG. 4A illustrates an exemplary optical analytical system comprising a single optical chip, two laser sources coupled to the optical chip using a light brush with multiple beamlets, and an alignment camera.
Figure 4B:
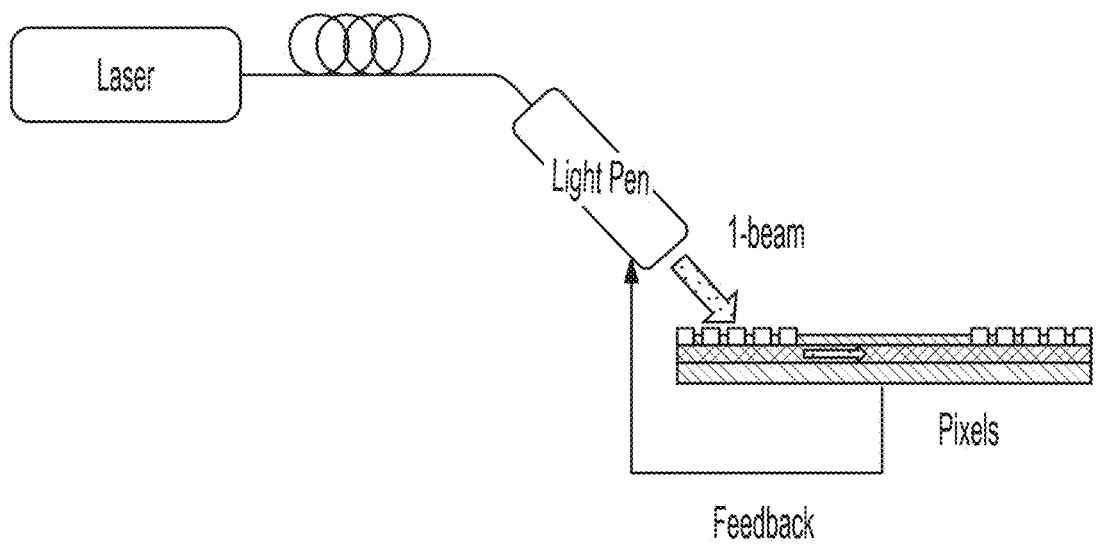
FIG. 4B illustrates a simplified exemplary optical analytical system comprising a single optical chip and a single laser source coupled to the optical chip using a light pen with a single beam. Alignment of the chip and the light pen is achieved using feedback from the optical detector within the chip itself.

In addition, known multiplexed waveguide devices comprise multiple input couplers per chip. For example, and as illustrated in FIGS. 4A-4C of U.S. Patent Publication No. 2016/0363728, different input couplers on the same chip can provide optical input to different types of waveguides, including, for example, "sequencing waveguides", which deliver light to nanoscale sample wells, where the reactions of interest, e.g., nucleic acid sequencing, take place, and "alignment waveguides", which are used to assess the positioning and alignment of the optical chip and the optical delivery device within the system. Positioning and alignment of optical chips is particularly important in optical analytical systems for nucleic acid sequencing, because the chips are physically inserted into, and removed from, the optical system during the course of use. Unlike coupled optical devices that are aligned during their manufacture and that can therefore be permanently attached to an optical delivery device, for example, optical devices used in the telecommunications industry, optical sequencing chips require positioning and alignment before each use.

The multiple input couplers per chip of known waveguide devices are also important, in some embodiments, for minimizing "routing losses" of optical energy within waveguides that deliver excitation energy to sample wells on a device. Such losses, which depend on the length of the waveguide through which the light travels, can impact the intensity of fluorescent signals that are output from a sample well, for example if the input excitation energy decreases too much along the waveguide. As illustrated in FIGS. 4A and 4B of U.S. Patent Publication No. 2016/0273034, the pathlengths of different sequencing waveguides can be significantly different, depending on the route followed by the waveguide to the sample well. Routing losses can in some cases be overcome, however, by delivering input optical energy to each waveguide of the target device from both ends of a sequencing waveguide simultaneously. Excitation of samples by counter-propagated light can create additional problems, however, for example as described in U.S. Patent Publication No. 2016/0273034. In particular, these problems can arise when a single optical source is split on a chip and delivered to different ends of a sequencing waveguide-so-called self-counter-propagation. These problems can in some cases be solved through the use of optical sources having different wavelength, phase, frequency, and/or amplitude, but providing the different optical inputs for counter-propagation typically requires that the different optical inputs be launched into the waveguides through separate input optical couplers.

The use of a multibeam optical delivery device to illuminate sequencing chips having multiple input couplers can cause complications that would be further compounded in systems comprising multiple optical chips and multiple input optical beams. For example, and as described in the optically coupled analytical systems of U.S. Patent Publication Nos. 2016/0273034 and 2016/0363728, excitation of target waveguide devices with multiple optical input couplers is typically achieved through the use of a multibeam optical delivery device, a so-called "light brush". As shown in FIG. 13B of U.S. Patent Publication No. 2016/0273034 and FIG. 4F of U.S. Patent Publication No. 2016/0363728, alignment of such a light brush with a target waveguide device involves control along six degrees of freedom: the x, y, and z positions within coordinate space, and the pitch, yaw, and roll rotational motions. Clearly, alignment of target devices with their optical delivery devices would become extremely complex in an analytical system with multiple target devices and multiple optical delivery devices if each device required an optimized alignment with respect to each of the six degrees of freedom.

FIG. 4A shows an exemplary optical analytical system comprising a single optical chip that is coupled to an optical delivery device that outputs multiple "beamlets", for example as disclosed in U.S. Patent Publication Nos. 2016/0273034 and 2016/0363728. The optical source in this system comprises two different lasers, each of which has an output with a different tunable wavelength and a power output of approximately 330 mW. The system further comprises an alignment camera to facilitate alignment of the multiple beamlets output by the light brush with the multiple input optical couplers on the target device.

FIG. 4B shows a simplified exemplary optical analytical system comprising a single optical chip that is coupled to an optical delivery device that outputs single beam, i.e., a "light pen". The system comprises a single non-tunable, broadband laser source of relatively low power, 50 mW at 522 nm. Alignment of the optical chip with the optical delivery device can be achieved through feedback directly from pixels in the integrated optical detector, as shown in the drawing, and there is accordingly no need for an alignment camera in the system. The optical chip can be designed either for single-sided excitation or for counter-propagation excitation. Exemplary systems of this type are disclosed in PCT International Publication No. WO2019/090192A1, which is incorporated herein by reference in its entirety.

Figure 5:
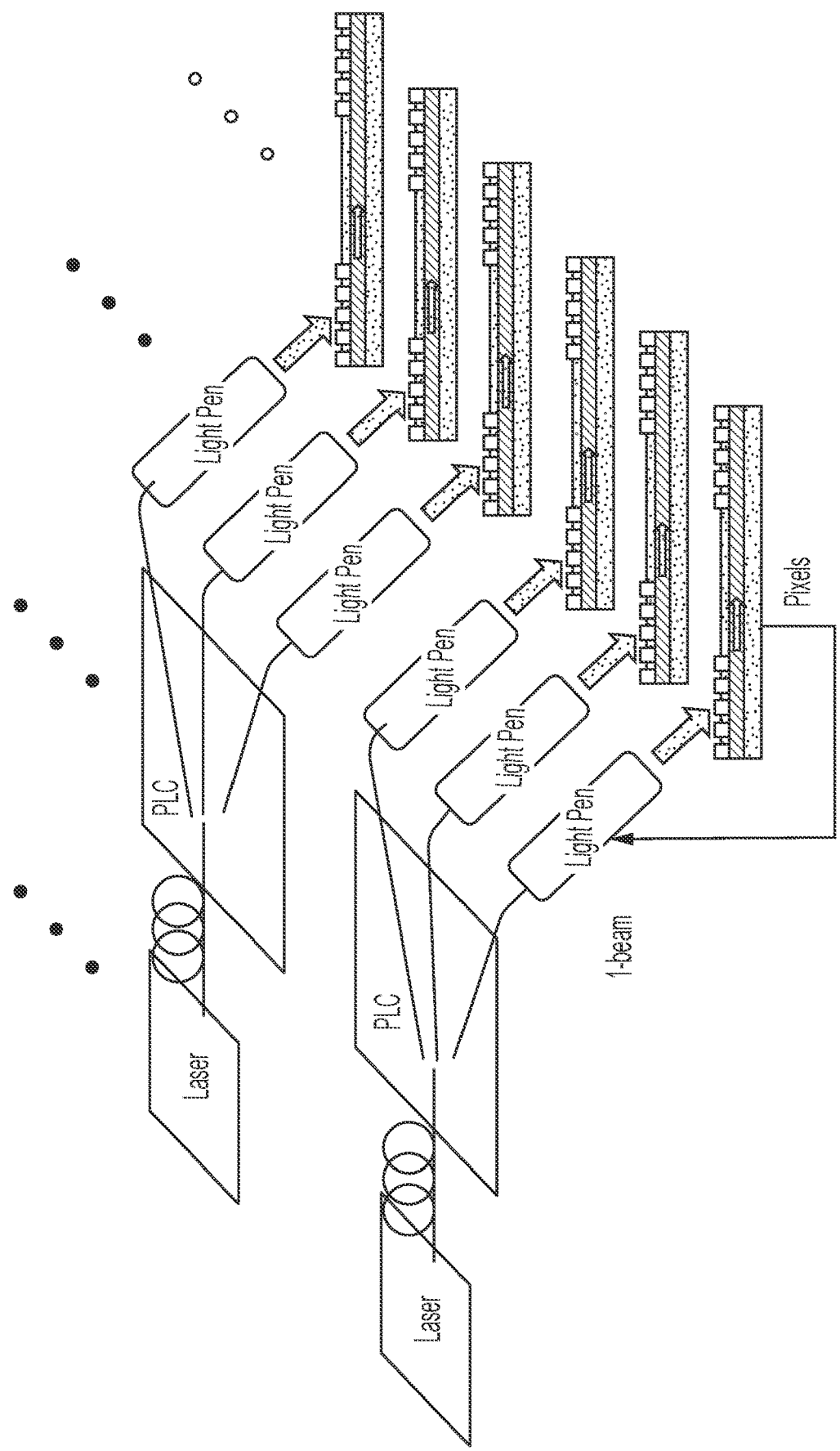
FIG. 5 illustrates a novel exemplary optical analytical system comprising a plurality of optical chips and laser sources coupled to each optical chip using a single light pen with a single beam. Alignment of the chips and the light pens is achieved using feedback from the optical detectors within each chip.

FIG. 5 shows a novel exemplary optical analytical system of the instant disclosure, where the system comprises a plurality of multiplexed optical chips, and where each of the multiplexed optical chips is illuminated by a single optical beam from a "light pen" optical delivery device. In this example, six chips are shown, but additional chips could be added, depending on the desired system configuration. As illustrated in FIG. 5, each light pen is optically coupled to a PLC device, which splits an optical input that is provided by a laser source into a separate input for each light pen. Each chip and light pen combination in the multiplexed system is therefore similar to the simplified single-chip system illustrated in FIG. 4B. As in that system, alignment of each chip with its light pen can be achieved by measuring output directly from the optical detector within the chip, for example by maximizing an output signal as the chip and/or the light pen are moved relative to each other during an alignment sequence. The multichip system therefore does not necessarily require a separate alignment camera, or other equivalent device, for performing this function.

It should also be understood that in addition to splitting the optical input from the laser source, the PLC can also be used to control the optical power transmitted to each output beam, and thus to each multiplexed optical chip, from the laser source. Such modulation of optical power delivered to each chip can be important where the individual sequencing chips require a different amount of laser power for optimal performance. Exemplary PLCs with modulated power output from each output beam are described in U.S. Patent Publication No. 2016/0273034, which is incorporated herein by reference in its entirety.

The modulation of power output from each output beam in the instant optical delivery devices can be achieved by any suitable means, as would be understood by those of ordinary skill in the art. In some embodiments, active modulation can be achieved using one or more variable optical attenuators (VOAs) fabricated within the optical delivery device. This approach allows the intensity of a given optical output to be modulated as desired as the device is being used, rather than having a fixed power output as defined by a splitter. VOAs are commonly used within a fiber optic communications line to reduce the optical fiber power to a certain desired level. Such VOAs can be, for example, fixed, step-wise variable, or continuously variable VOAs. VOAs can be used to reduce the power output of an optical beam within an optical delivery device for example from 100% to 0.3%, or even lower, and to any specific output power within that range. In some embodiments, the attenuation range is from 1 dB to 20 dB.

The ability to increase the sequencing multiplex in some of the above-described systems can be achieved, at least in part, by reducing the input irradiance requirements of the sequencing chips in the system, so that multiple chips can be irradiated within the system using a single optical source whose output is divided into separate beams. As mentioned above, previous sequencing chips typically required approximately 1 $\mu W/\mu m^2$ at a reaction region, whereas the sequencing chips used in the instant systems can require roughly ten-fold lower power density, or approximately 0.1 $\mu W/\mu m^2$ at a reaction region. Accordingly, in some embodiments, the sequencing chips used in these systems can require a power density of no more than 1.0 $W/\mu m^2$, no more than 0.5 $\mu W/\mu m^2$, no more than 0.4 $\mu W/\mu m^2$, no more than 0.3 $\mu W/\mu m^2$, no more than 0.2 $\mu W/\mu m^2$, no more than 0.1 $\mu W/\mu m^2$, or even less per reaction region.

Although the specific choice of a laser source for the just-described, highly-multiplexed optical system may depend on other design features and choices in the system, a suitable laser would, for example, be a laser that outputs no more than 2000 mW, 1000 mW, 500 mW, 200 mW, 100 mW, or even less. In some embodiments, the laser displays these power outputs at a wavelength of from approximately 450 nm to approximately 700 nm. In more specific embodiments, the laser is a wavelength-tunable laser, for example a wavelength tunable laser that outputs approximately 330 mW at approximately 548 nm. In other more specific embodiments, the laser is a wavelength-tunable laser that outputs approximately 660 mW at approximately 548 nm.

As will be described in more detail below, the sequencing chips illustrated in FIG. 5 can be mounted together on the same substrate and can thus share packaging functions such as fluid interfaces, handling features, and the like. Alternatively, each sequencing chip can be mounted on its own separate substrate and package. In some embodiments, the sequencing chips can be arranged on a substrate and package in pairs, in triplets, or in any other suitable multiple.

As also illustrated in FIG. 5, the optical sequencing chips of the novel systems can be illuminated from a single side using a single input coupler on the chip. The use of a simple, single-beam optical source, from a so-called "light pen", can reduce the cost of optics in these systems roughly five- to ten-fold. In addition, a single laser source can be used to power multiple chips by splitting its light, for example using a PLC as shown in FIG. 5, thus further decreasing the cost and complexity of the optical system. As mentioned above, in specific system embodiments, the PLC can include an active power control on each channel, for example as described in the optical delivery devices disclosed in U.S. Patent Publication No. 2016/0273034.

Although single-beam, single-sided light pen illumination of a sequencing chip can significantly simplify design, reduce costs, and increase the multiplex of sequencing reactions on optical chips, such improvements can be achieved only if the laser power penalty required to achieve spatial uniformity across all ZMWs is relatively small. In some embodiments, this uniformity can be achieved by reducing propagation loss along the sequencing waveguide, for example, by making the ZMW hole size smaller to reduce ZMW scatter, by reducing side wall roughness, or by reducing loss from proximity of the sequencing waveguide to the ZMW metallic layer on the surface of the chip. Making the gap between ZMWs larger can help to reduce ZMW scatter but may require increased laser power.

Figure 6:
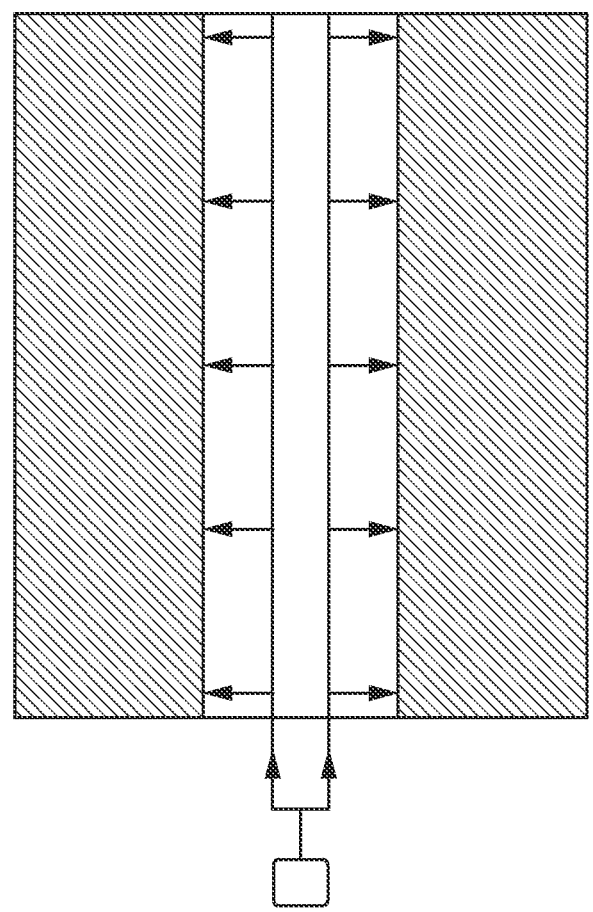
FIG. 6 shows an alternative chip design that minimizes propagation losses by locating the input coupler and routing waveguides in the middle of the chip.

Yet other approaches to decrease propagation losses involve using a relatively narrow chip, thus reducing waveguide length across the active area, or using a split chip, where the input coupler is placed in the middle of the chip, for example as shown in FIG. 6, where the input coupler is represented as a square on the left side of the chip. In this example, light launched into a waveguide associated with the input coupler is first split into two routing waveguides (indicated by the two rightward arrows), and those routing waveguides are further split along the length of the chip into sequencing waveguides, as indicated by the up and down arrows. In other words, the routing waveguides bisect the optical chip. In this approach, propagation losses should be only half as much as are observed with a full-width chip due to the shortened length of the sequencing waveguides. Other issues may arise using this approach, however, for example background fluorescence in the active area due to leakage of evanescent light from the routing lines. Such background fluorescence can be suppressed either by covering the routing lines with a thin metal layer or by using light absorbing beads. Other approaches for reducing propagation losses and increasing the efficiency of sample illumination in the ZMWs are described, for example, in U.S. Patent Publication Nos. 2012/0085894, 2014/0199016, and 2014/0287964, which were previously incorporated by reference.

Figure 7:
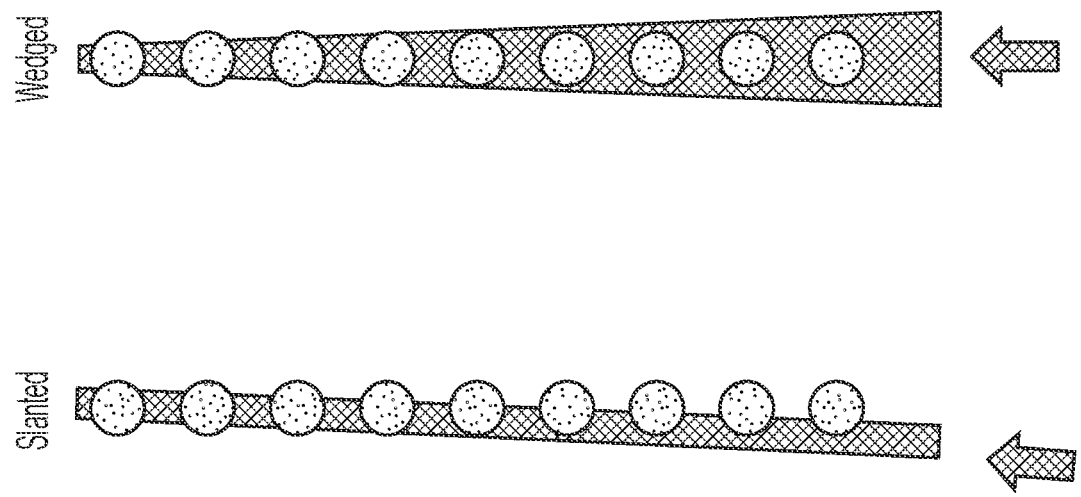
FIG. 7 shows exemplary chip designs where the sequencing waveguide and the ZMWs are configured and positioned to achieve spatial uniformity with single-sided waveguide illumination.

Other approaches for improving spatial uniformity in systems where the sequencing waveguides are illuminated from a single side are illustrated in FIG. 7. As shown in the left panel of this figure, a linear sequencing waveguide of uniform width can be designed to provide progressively increasing overlap with a row of ZMWs (shown from above as circles) by "slanting" the orientation of the waveguide relative to the row of ZMWs. Although the optical energy within the sequencing waveguide decreases as the light progresses down the waveguide in the direction of the arrow, the increasing overlap with the ZMWs further along the waveguide compensates for the loss and provides higher uniformity of illumination along the entire row of ZMWs. Alternatively, as shown in the right panel of this figure, the sequencing waveguide can be fabricated with a "wedged" shape to compensate for propagation losses further along the waveguide and thus provide higher uniformity of illumination for the ZMWs along the entire row. It should be understood that the input power required for these designs may need to be somewhat higher than in chip designs where the waveguides have uniform dimensions and are directly in line with the ZMWs they illuminate.

As described in U.S. Patent Publication Nos. 2016/0273034 and 2019/0179078, self-counter-propagation (i.e., splitting an input optical source on the chip and directing the split input light to opposite ends of the same sequencing waveguide) does not necessarily solve the problem of propagation loss in a sequencing chip with a single-sided input coupler, where the optical source is a quasi-single-mode narrow-band coherent laser, since the self-counter-propagation can result in a spatially non-uniform and temporally unstable illumination pattern due to coherence effects. However, as further described in U.S. Patent Publication No. 2016/0273034, this problem can be solved by modulation of the phase, frequency, and/or amplitude of optical source or, as described in U.S. Patent Publication No. 2019/0179078, the problem can be solved using a broadband, multi-longitudinal optical excitation source. Such approaches, in particular, as the power outputs of broadband, multi-longitudinal sources continue to be increased, and as the power requirements of highly multiplexed sequencing chips continue to be decreased, are well suited for use in the instant optical analytical systems comprising a plurality of multiplexed optical chips.

Figure 8A:
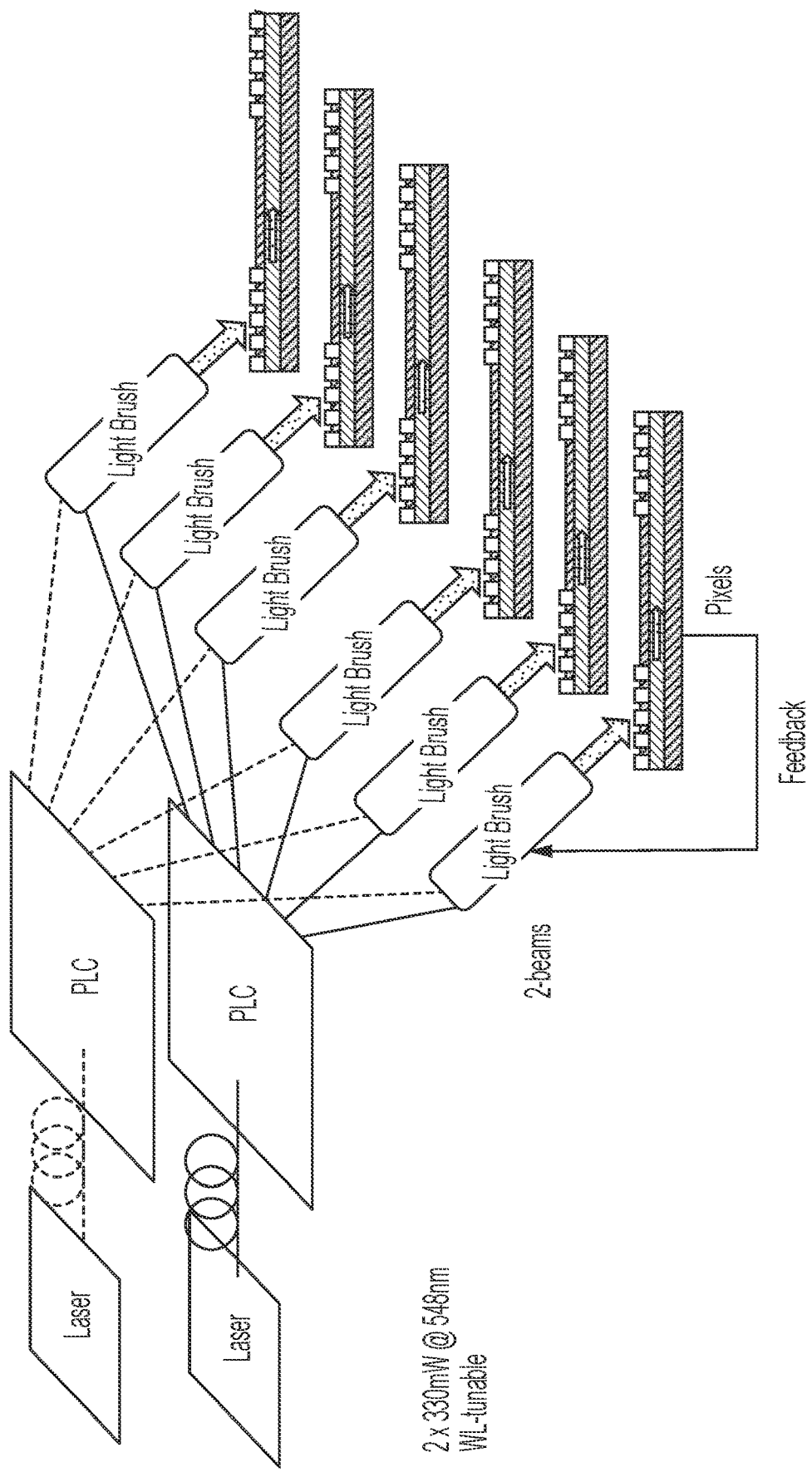
FIGS. 8A and 8B show alternative exemplary optical analytical systems comprising a plurality of optical chips and laser sources coupled to each optical chip using a single two-beam light brush. Alignment of the chips and the light brushes is achieved using feedback from the optical detectors within each chip.
Figure 8B:
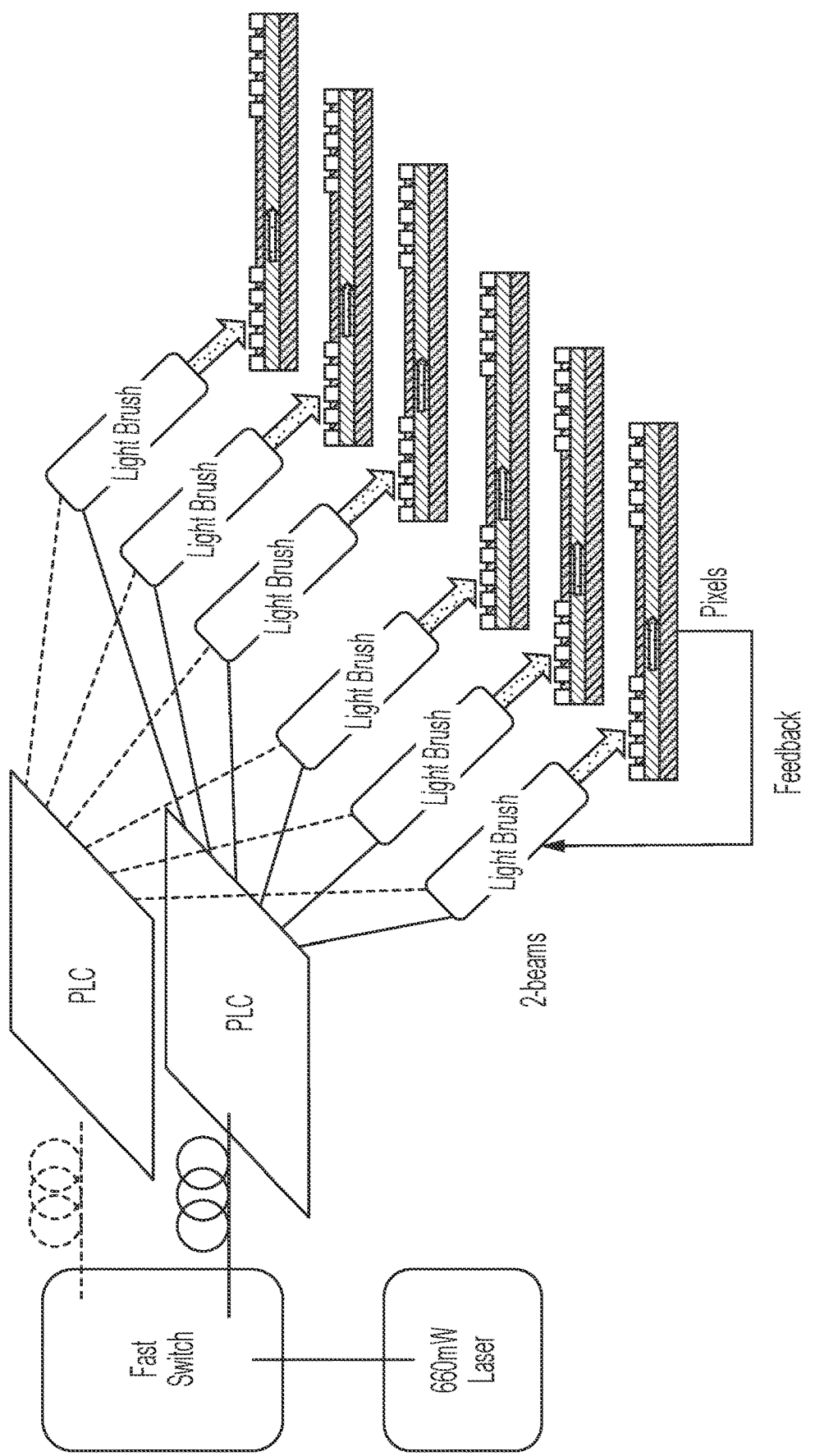

FIGS. 8A and 8B illustrate alternative configurations of an optical system comprising a plurality of multiplexed optical chips and a plurality of input optical beams, where the chips are each illuminated by a two-beam light brush (also referred to as a "light fork") rather than a single-beam light pen. These systems overcome the above-described problems associated with the use of self-counter-propagated optical inputs by delivering two different wavelengths of optical illumination to each chip. The two different optical inputs are routed on the chip to opposite ends of each sequencing waveguide, thus overcoming the problems of propagation losses and coherence effects. In particular, the use of different wavelengths can help prevent the formation of interference patterns, such as standing waves, within a waveguide. Modulation of the wavelength of light illuminating a sequencing waveguide over time, or the use of a single broadband multi-longitudinal mode optical source, can also address the problem of link efficiency variation (LEV), as described in U.S. Patent Publication Nos. 2016/0216538 and 2019/0179078, wherein some waveguides exhibit an undesirable back reflection that is variable over time when the waveguides are illuminated with a laser having a single wavelength. Use of two input optical beams also allows the adaptation of current sequencing chips with minimal modification. Furthermore, although two lasers are required in these system configurations, the laser outputs are shared between multiple chips, thus reducing cost and complexity of the systems. For example, in some embodiments, the lasers illuminate 2, 4, 6, 8, or even more different sequencing chips. In specific embodiments, the PLCs or light brushes of these optical systems comprise an active power control for each output beam. In the exemplary optical system of FIG. 8A, the system comprises two lasers, each of which is a wavelength-tunable laser outputting, for example, 330 mW at 548 nm.

In the exemplary system of FIG. 8B, the system comprises one wavelength-tunable laser outputting, for example, 660 mW at 548 nm. The system illustrated in this figure further comprises a fast switch to enable the laser to deliver different wavelengths of light to multiple PLCs that are optically coupled to the laser. For example, and as shown in FIG. 8B, the laser can be switched back and forth between two PLCs, and each PLC can, in turn, direct different wavelengths of light to multiple sequencing chips. The switching frequency can be chosen to exceed not only the update frequency of the optical detectors on each of the sequencing chips but also the diffusion rates of the fluorescent nucleotides in and out of the reaction regions on the sequencing chips. Such considerations can be helpful to avoid increased background noise. More specifically, the tuning of the optical source can be used to manage slow material non-linearities that can result in Hill-type Bragg gratings. If the tuning is slow on the time scale of the fast switch, then an explicit coordination of the two may not necessarily be required. In specific embodiments, the switch is a piezoelectric device (e.g., a lead zirconate titanate (PZT) switch) that enables fast (e.g., preferably greater than 50 kHz) switching between the two PLCs. In preferred embodiments, the switch and the PLCs are combined in the same chip package. Illumination provided by the fast switch component of the optical source preferably has several, or many, periods within the typical duration of diffusion of fluorophores through an illumination volume, in order to minimize noise in the system.

In the optical systems of FIGS. 8A and 8B, alignment of the sequencing chip with the light brush optical delivery device is preferably achieved using feedback directly from the detector on the chip, for example a CMOS detector, so that in preferred embodiments, no alignment camera is required.

Figure 9A:
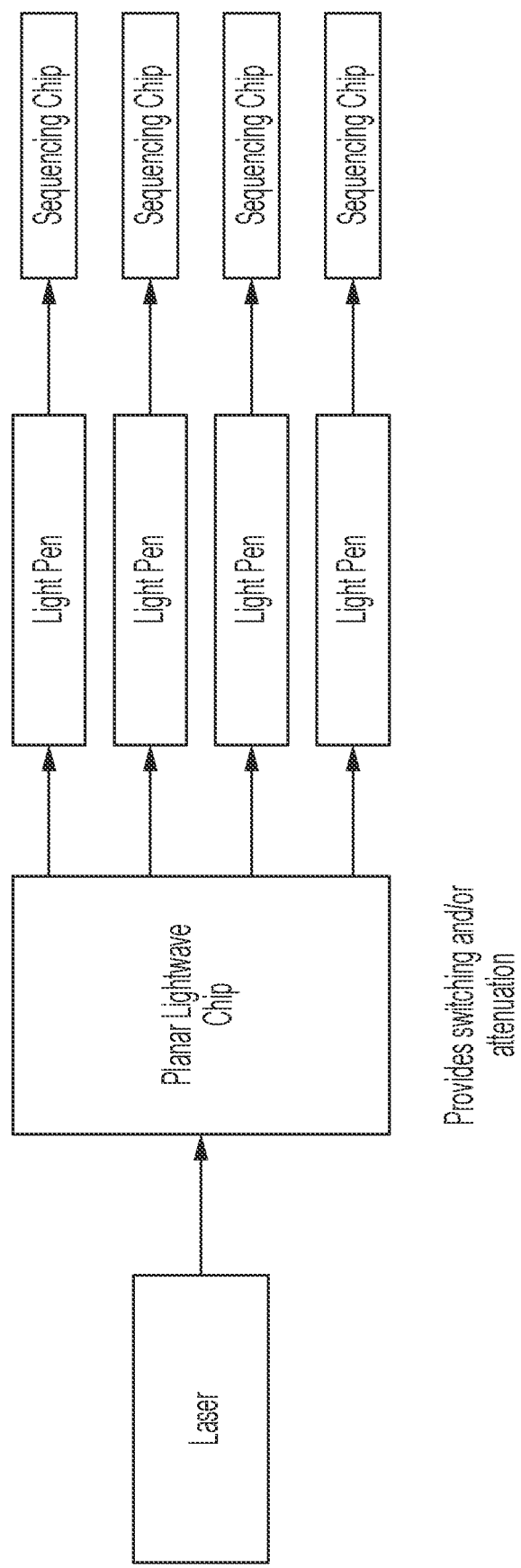
FIGS. 9A-9C illustrate alternative exemplary optical analytical systems comprising a plurality of optical chips and an optical source coupled to each optical chip using a single light pen with a single beam.
Figure 9B:
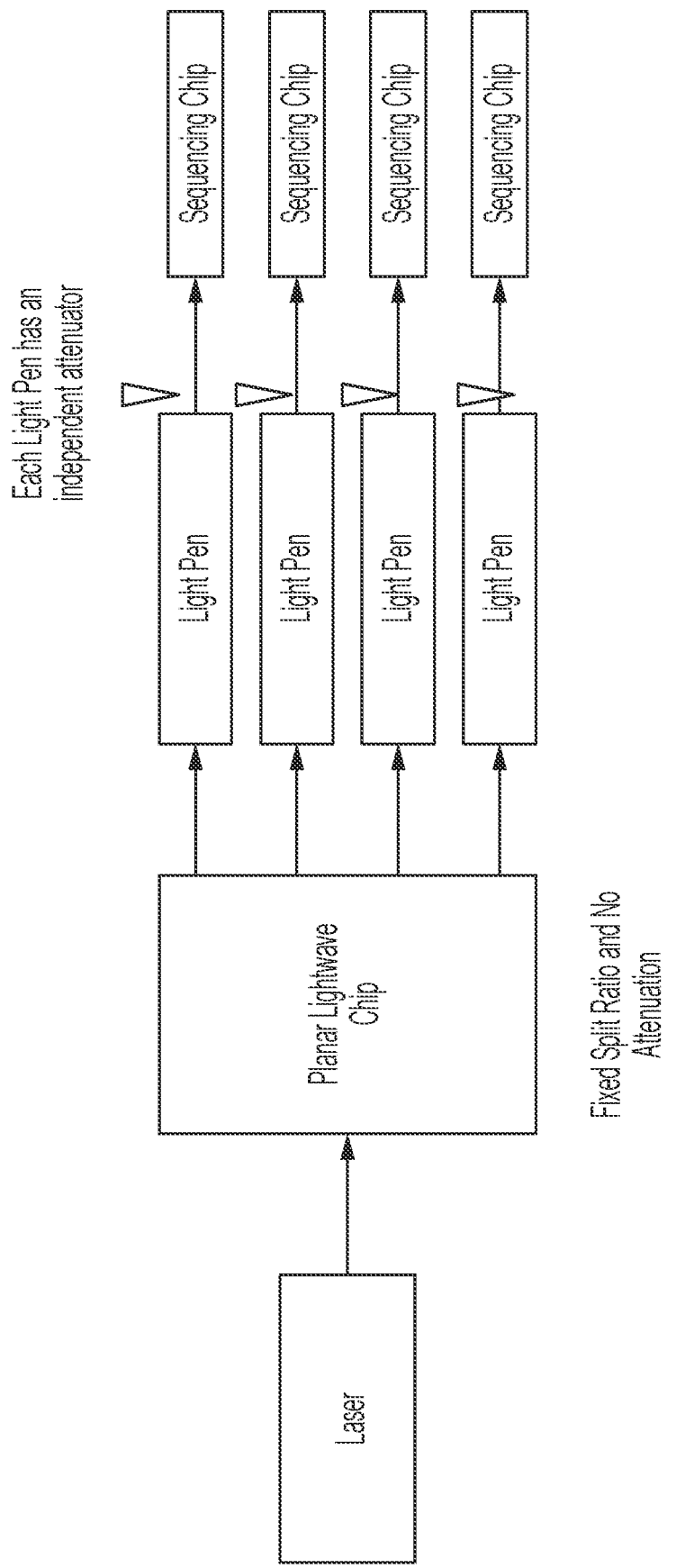
Figure 9C:
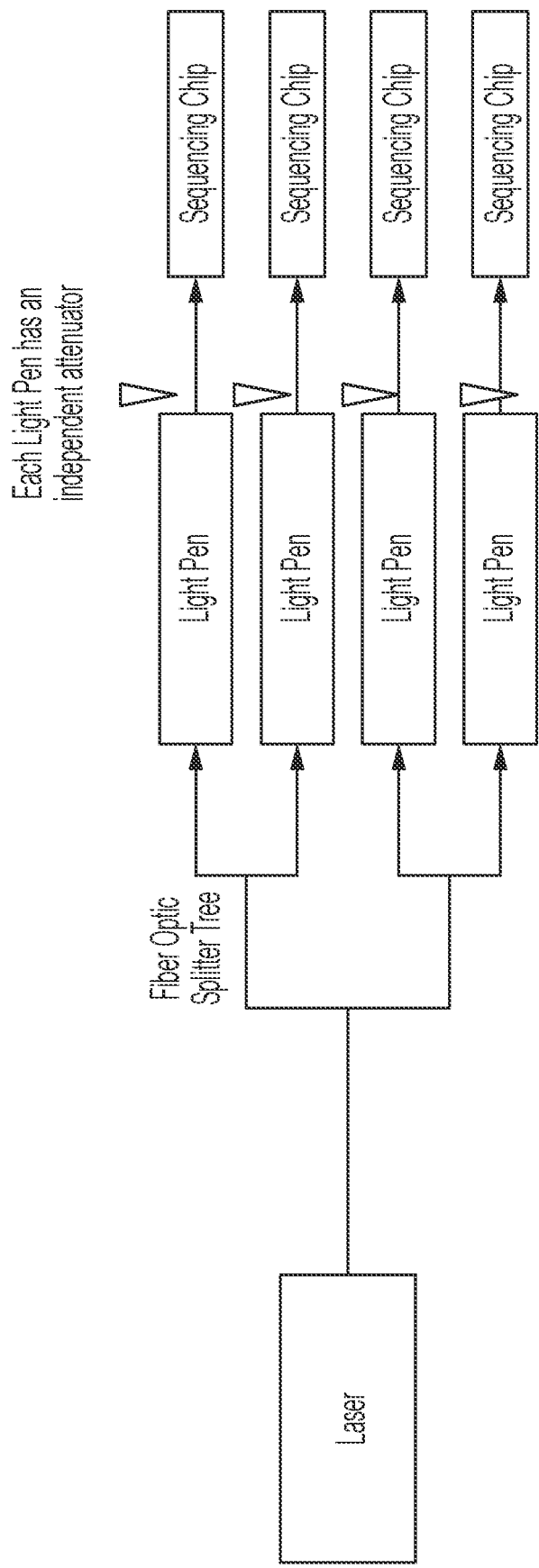

FIGS. 9A-9C illustrate yet other alternative configurations of the optical system shown in FIG. 5, where each of the sequencing chips is illuminated by a single-beam light pen. For example, as shown in FIG. 9A, the PLC can split an input optical source, for example an input laser source, into multiple output beams for delivery to each of the associated light pens. In this example, the PLC is designed to control switching of the optical output and/or to control attenuation of optical power to the different light pens. In specific embodiments, at least one optical channel comprises an active power control, for example a variable optical attenuator.

In the embodiment illustrated in FIG. 9B, the PLC splits the input optical source at a fixed ratio to the different light pens without attenuation of the output power. Power output is controlled at each light pen by an independent attenuator associated with the light pen. In the embodiment illustrated in FIG. 9C, splitting of the optical source to the light pens is performed by a fiber-optic splitter tree. As was the case in the system of FIG. 9B, power output from the light pens is controlled by an independent attenuator associated with each light pen.

As the optical power requirements per ZMW on sequencing chips decline, the need to use optical sources with different wavelengths of light and/or with multiple longitudinal modes in order to prevent the formation of interference patterns in waveguides excited using counter-propagated light or link efficiency variation (LEV) can become less important. Accordingly, in some embodiments, the optical source of the instant highly multiplexed optical analytical systems may be a single-wavelength optical source (i.e., a monochromatic or quasi-monochromatic optical source).

For similar reasons, in some embodiments, the optical source in these systems is not a broadband, multi-longitudinal optical source. For example, in some embodiments, the optical source is a narrow-band coherent laser. It should be understood, however, that light sources that are not considered to be broadband can still emit more than one longitudinal mode.

Monochromatic or quasi-monochromatic optical sources can, in some embodiments, even be used with sequencing chips that have normal optical power requirements per ZMW and/or that are not designed to use counter-propagated waveguide excitation, in particular if they are combined with chip designs where propagation losses can be reduced and/or where the efficiency and spatial uniformity of sample illumination can be increased, for example as provided in the designs described above, in the patent publications referenced above, and as illustrated in FIGS. 6 and 7.

As illustrated throughout this section, the optical analytical systems of the instant disclosure preferably comprise a plurality of multiplexed optical chips. In embodiments, the optical analytical systems comprise at least two multiplexed optical chips, at least three multiplexed optical chips, at least four multiplexed optical chips, at least six multiplexed optical chips, at least eight multiplexed optical chips, or even more multiplexed optical chips per system, thus greatly increasing the multiplex of sequencing reactions that can be performed simultaneously compared to known sequencing systems. In these systems there is typically one optical delivery device, for example a light pen or a light fork, for each multiplexed optical chip. Accordingly, these optical analytical systems can comprise at least two optical delivery devices, at least three optical delivery devices, at least four optical delivery devices, at least six optical delivery devices, at least eight optical delivery devices, or even more optical delivery devices per system. Any of these systems can further comprise one or more planar lightwave chips to split, switch, and/or attenuate light provided to the optical delivery devices.

Small Form-Factor Modular Optical Sources

As described above, current multiplexed optical sequencing chips may include multiple optical input couplers on each chip in order to provide the required sample illumination and to facilitate proper alignment of the sequencing chip with the optical source. In addition, the multibeam optical delivery device (e.g., a light brush) is typically positioned a significant distance away from the sequencing chip in order to facilitate insertion and removal of the sequencing chip from the analytical system between sequencing runs. Although the use of free-space coupling, using optical delivery devices and couplers having low numerical aperture and couplers having relatively large surface area, offer some advantages compared to direct, or nearly direct, coupling methods (see, e.g., U.S. Patent Publication No. 2016/0363728), alignment of such optical sources, in particular alignment of multibeam optical delivery devices, necessarily involves controlling most, if not all, of the translational and rotational degrees of freedom, i.e., the x, y, and z positions within coordinate space, and the pitch, yaw, and roll rotational motions. In addition, the relatively large working distance required for free-space coupling (e.g., as much as 100 mm in existing systems) necessitates the use of bulk optics in the delivery of an illumination signal to the chip. The use of bulk optics may require further compensation for magnification and/or pattern rotation. Furthermore, crosstalk between adjacent couplers on a sequencing chip (e.g., due to Gaussian overlap) can preclude shrinking of the sequencing field of view on the chip.

The instant inventors have discovered that miniaturization and modularization of the optical delivery devices in a highly multiplexed optical sequencing system, can provide distinct advantages over known approaches using free-space-coupled optical sources, particularly in a system comprising multiple optical sequencing chips or in a system comprising a larger chip constructed by field stitching. For example, reducing the size of an optical delivery device to less than the size of a sequencing chip in at least one dimension permits a scalable modular opto-mechanical architecture for a sequencing instrument with multiple chips. Use of multiple chips in parallel with small form-factor modular optics thus permits increased aggregate chip area (whether on multiple separate chips or on multiple dies packaged on a single chip-see below) at a linear cost in die area, while also permitting the use of low-cost (per Watt) optical sources (e.g., diode lasers) in a compact overall system.

Figure 10:
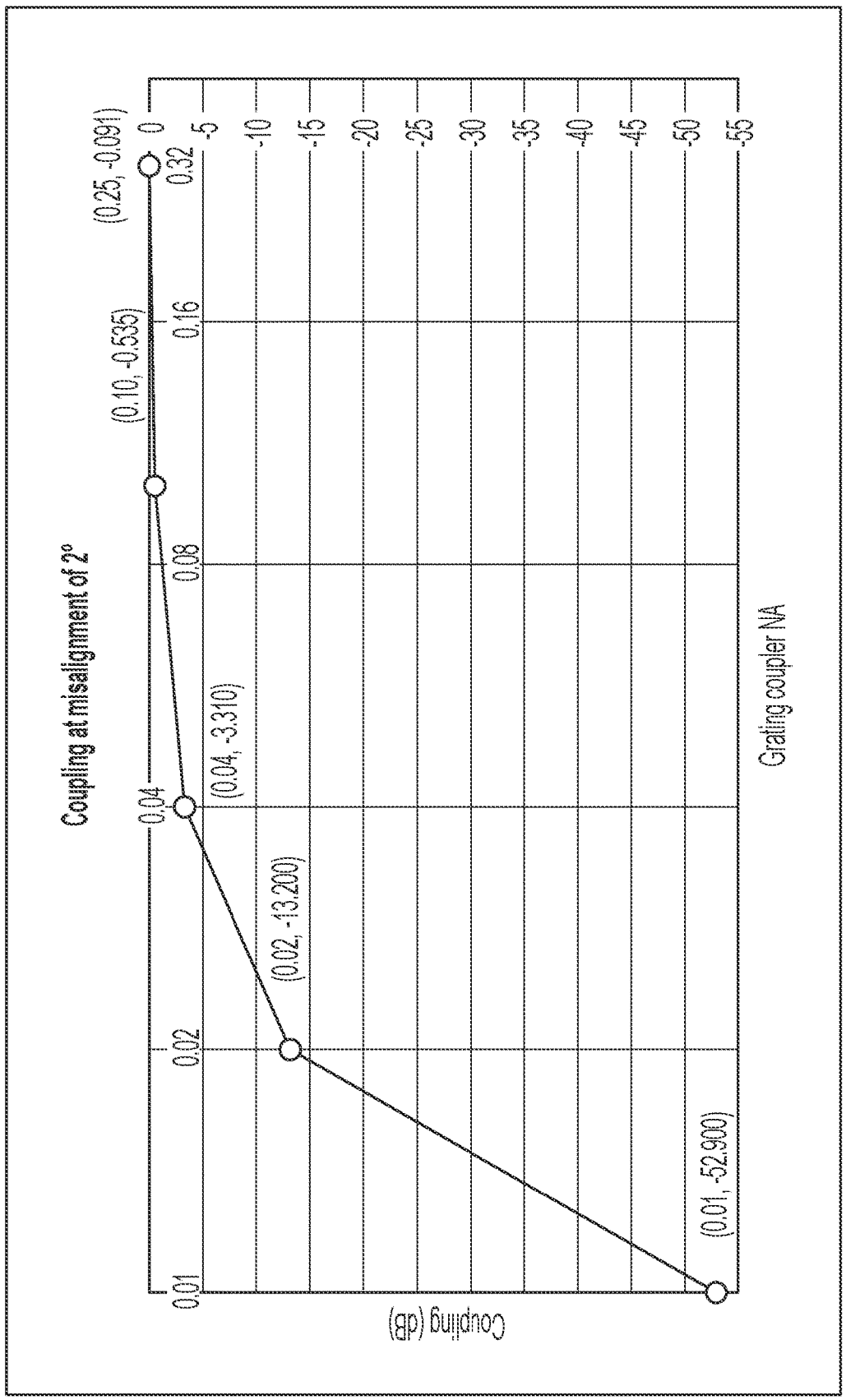
FIG. 10 shows the relationship between coupling efficiency and numerical aperture in a Zemax simulation, where the grating coupler and optical input are misaligned by 2° in pitch or yaw.

In some aspects, the numerical aperture of the illumination beams of the small form-factor optical delivery devices in these systems is designed to be sufficiently high that fewer degrees of freedom need be controlled in order to couple optical energy from an illumination beam to an optical coupler on a target chip. As illustrated in the simulation shown FIG. 10, for a grating coupler with numerical aperture of 0.01, angular misalignments of 2° in pitch or yaw reduce the coupling efficiency to nearly zero, whereas couplers having numerical apertures of 0.4, 0.10, and 0.25 display nearly maximal coupling. Accordingly, in the systems comprising a plurality of small form-factor optical delivery devices and a plurality of sequencing chips, the numerical aperture of the optical coupler is preferably at least 0.4, at least 0.6, at least 0.8, at least 0.10, at least 0.125, at least 0.25, or even higher. In such systems, the pitch and yaw degrees of freedom of the optical delivery device therefore need not be as carefully controlled as in existing systems.

Figure 11:
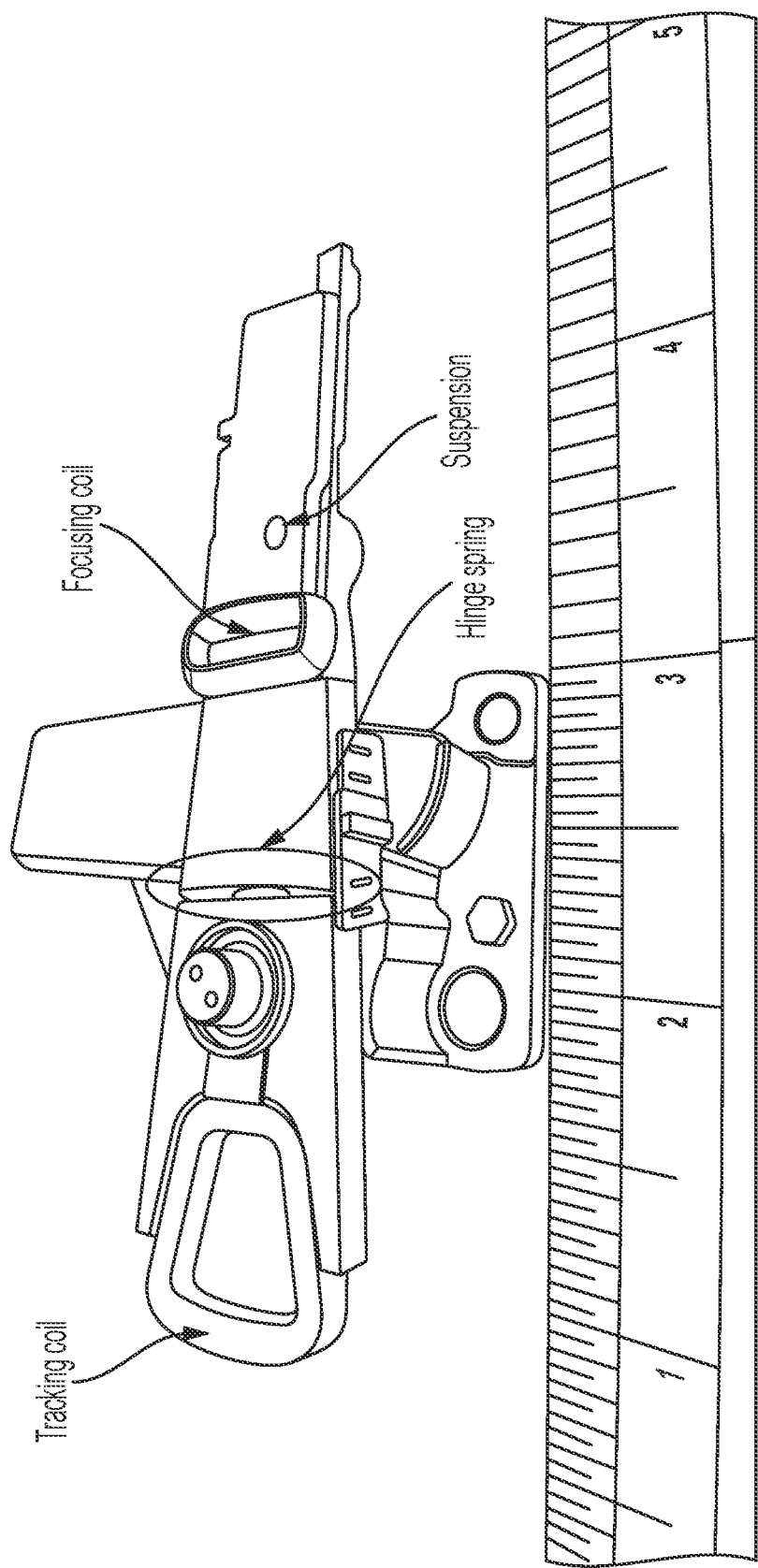
FIG. 11 illustrates an exemplary swing arm actuator.

Suitable small form factor, modular optical delivery devices for use in the instant systems are known in the art. For example, the laser optics used in compact disk (CD) and digital versatile disk (DVD) technologies can provide suitable characteristics for use in the instant systems. Optical disk drives typically include laser diodes (emitting infrared light for CDs, red light for standard DVDs, and violet light for Blu-ray DVDs), which can be adapted for use as optical sources in the instant optical delivery devices. Laser diodes are small and have low mass, and the mechanics of positioning them relative to the relevant input couplers on a sequencing chip can be adapted from optical disk and hard disk drive technologies. For example, a swing arm actuator-type device can be rotated to provide fine and coarse tracking in one positional direction. In hard disk drives, this rotation is controlled by a "tracking coil", which is well understood by those in the art. Control of a modular optical delivery device in the two other positional directions can be provided in a variety of ways. For example, focus adjustments (i.e., movement up and down relative to the surface of the sequencing chip) can be controlled by a "focusing coil" or other suitable controller for this type of flexure. An exemplary swing arm actuator is illustrated in FIG. 11. Further actuator and optical head designs are provided, for example, in Chou et al. (2010) *IEEE Transactions on Magnetics* 46:7 2603-1610 (doi.org/10.1109/TMAG.2010.2045388); Blankenbeckler et al. (2004) Proc. SPIE 5380, Optical Data Storage (doi.org/10.1117/12.557112); and Bell et al. (2001) Proc. SPIE 4342, Optical Data Storage (doi.org/10.1117/12.453385), each of which is incorporated herein by reference in its entirety.

Figure 12B:
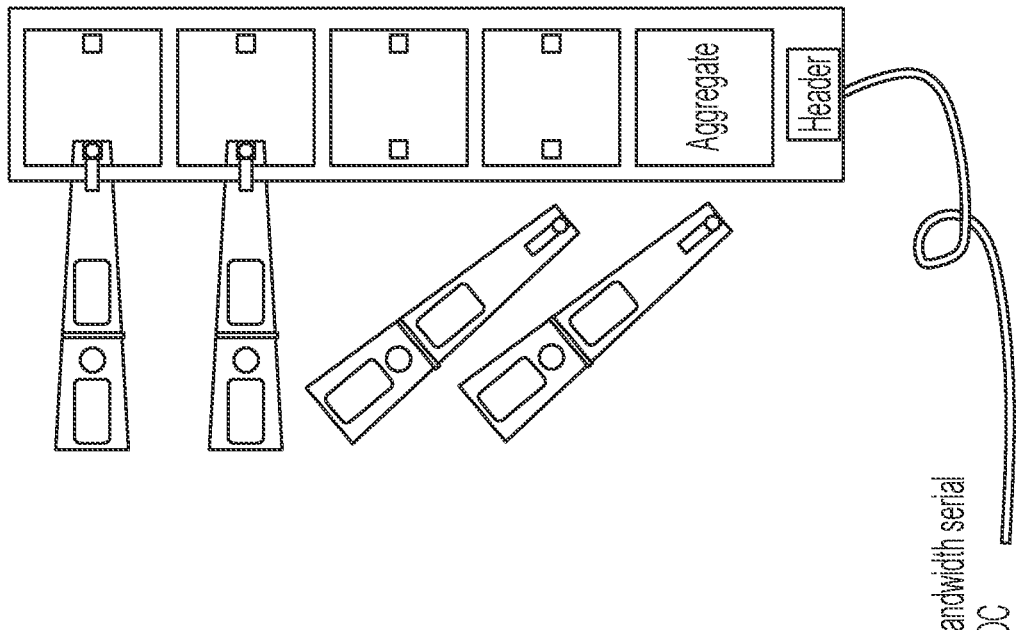
FIGS. 12A and 12B illustrate an exemplary optical analytical system comprising a plurality of optical chips and a plurality of small form factor modular optical sources, where each optical source is included in a swing arm actuator to form an optical delivery device.
Figure 12A:
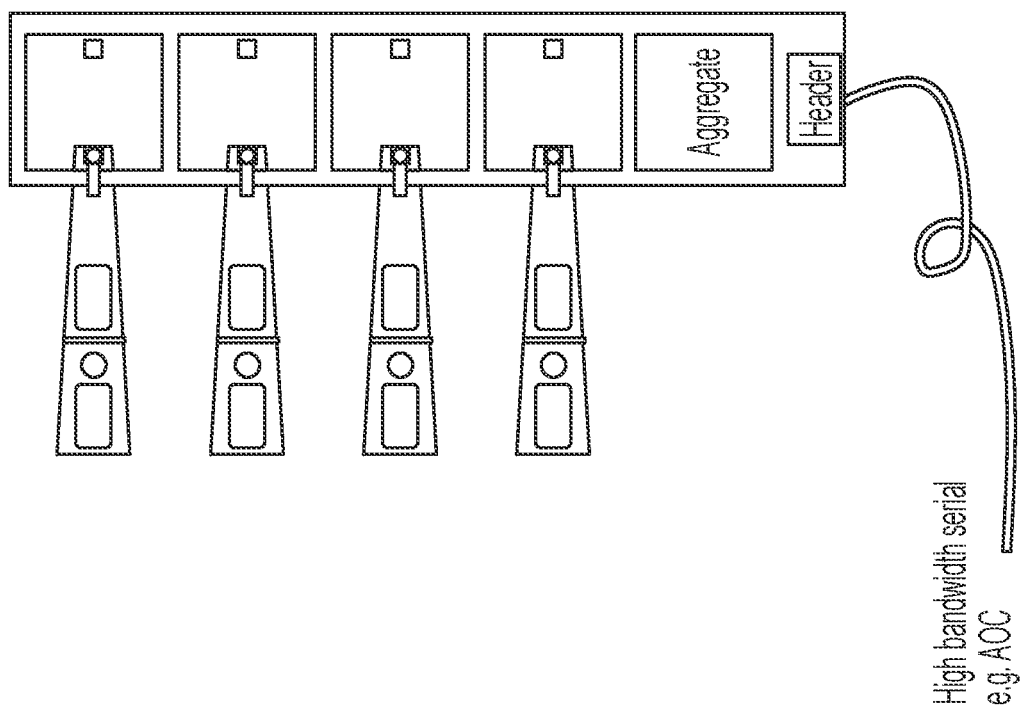

An exemplary arrangement of sequencing chips and swing arm actuator-type optical delivery devices is illustrated in FIGS. 12A and 12B. All four swing arm actuators in FIG. 12A are in the "loaded" position, where the laser diode or equivalent modular optical source at the end of each arm is aligned with an input optical coupler on each of the four sequencing chips. In FIG. 12B, the top two actuators are shown in the "loaded" position, where the laser diode or equivalent modular optical source is positioned over an input optical coupler on the top two sequencing chips, and the bottom two actuators are shown in the "unloaded" position. As should be clear from this illustration, the system may be designed to allow for the removal of individual sequencing chips even as other chips in the system are being actively monitored. Where multiple sequencing chips are packaged on a single substrate, however, it will be necessary to move all of the actuators into the "unloaded" position in order to remove the sequencing chips from the system. The hatched square on the right side of each sequencing chip in FIGS. 12A and 12B is intended to represent an optional second optical coupler, for example to be used with an optional second set of swing arm actuator-type optical delivery devices, where the second set of optical delivery devices have optical properties chosen for suitability in the above-described counter-propagation approaches.

In other aspects, the disclosure provides the above-described analytical systems and further comprises a component for datastream grooming with a dedicated high bandwidth path, thus avoiding a substantially increased insertion force per chip if the typical chip interconnections, such as pogo pins, were scaled. For example, the separate sequencing chips shown in each of FIGS. 12A and 12B can be electrically connected to minimize the need for a complete set of separate pins on each chip, and optical sensor data from each chip can be groomed (i.e., aggregated) along a high bandwidth path (e.g., into an active optical cable ("AOC"), as shown in the drawings) in order to minimize the total number of pins. In preferred embodiments, pins need be retained on each chip only for power, ground, and serial communications. For low loss-per-unit-distance/high bandwidth links (e.g., optical fiber), the link can permit remote placement of some, or all, data processing and computational resources. In turn, the remote placement of the data processing and computational resources can reduce the requirement within a wet chemistry lab for heat dissipation, electrical power draw, and physical space of those resources, and can locate the resources where these requirements can more cost-effectively be met (e.g., within a computer room).

Furthermore, monolithically integrated features, e.g., realized by bulk anisotropic etching of silicon substrates of each chip, may permit a multi-chip module with highly repeatable spacing between the multiple chips, and thereby substantially reduce the range of adjustment needed to achieve efficient coupling with the optical delivery devices. If these features are realized on the backside of each chip substrate, there is no inherent compromise of front side area dedicated to sequencing. Corresponding features may be implemented on the multi-chip module substrate or could be implemented in a tool used during the time that chips are fixed onto a lower value multi-chip module substrate.

Multichip Assembly

As described above, current multiplexed single-molecule real time sequencing systems typically comprise a single optical chip. Process flows used to fabricate such chips on larger silicon wafers are described, for example, in U.S. Pat. No. 9,372,308 and U.S. Patent Publication No. 2016/0061740. Following the fabrication steps, and as described in these references, the wafers are generally further processed in various ways, including dicing the wafers to generate individual chips (or "dies") and packaging the individual chips onto substrates, for example ceramic substrates or the like.

Figure 13:
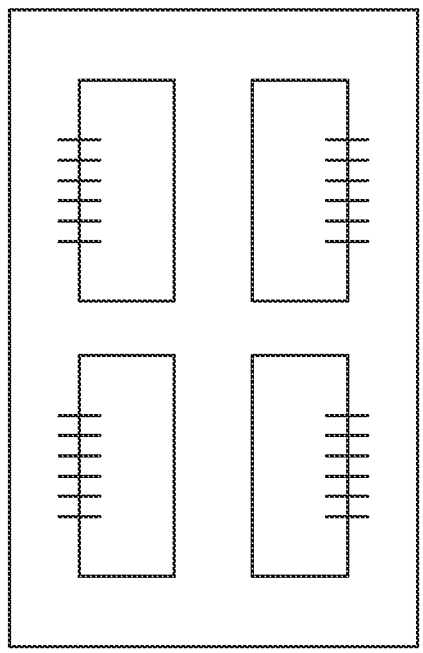
FIG. 13 illustrates exemplary arrangements of multiple sequencing chips ("dies") in a single package.
Figure 13:
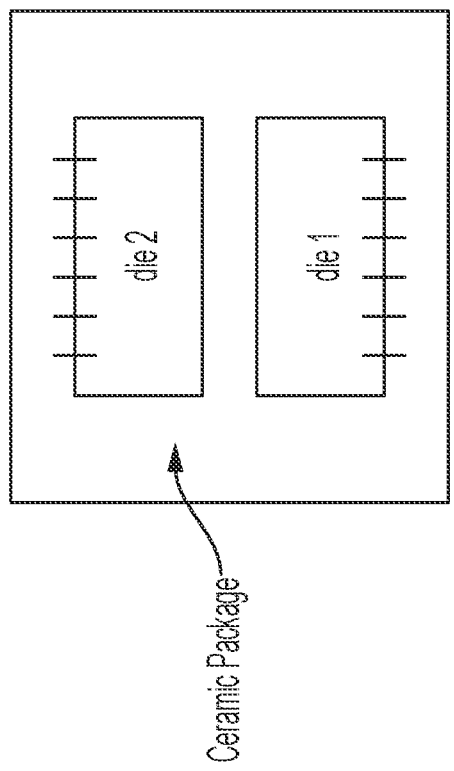

In cases where wafer yield is low and assembly yield is high, it may be advantageous to assemble multiple dies onto a single package, for example by attachment to a printed circuit board (PCB), a ceramic substrate, or the like, in order to increase system performance and/or throughput. Two exemplary multi-die packages comprising either two dies (left) or four dies (right) are illustrated in FIG. 13. Such multi-die packages can advantageously be illuminated using the optical delivery methods and systems described in the previous sections. Other exemplary packaged nucleic acid sequencing devices are disclosed in U.S. application Ser. No. 17/149,455, filed on Jan. 21, 2021, which is incorporated herein by reference in its entirety for all purposes.

Optical Delivery to Novel Edge Couplers

Although the sequencing chips described above typically include grating couplers to launch optical excitation into the waveguides of the devices, it should be understood that it may, in some situations, be advantageous to couple an optical source from the edge of the sequencing chip. In particular, where the optical input is provided by an optical fiber, it may be advantageous to expand the waveguide mode size near the edge of the chip in order to improve the coupling. See, e.g., Papes et al. (2016) *Optics Express* 5026 (doi.org/10.1364/OE.24.005026).

In the case of the sequencing chips described herein, however, it can be difficult to expand the input coupler above the chip, for example as described in Papes et al., due to the integration of the ZMW layer, which is preferably in close proximity to the high index waveguide layer in the sequencing region of the chip.

In order to address this issue, the instant inventors have designed an improved edge coupler structure, wherein the structure is fabricated near the perimeter of the chip and comprises a transparent rib index waveguide that is approximately the same thickness as the collection optics stack of the unit cell of the sequencing chip.

Figure 15A:
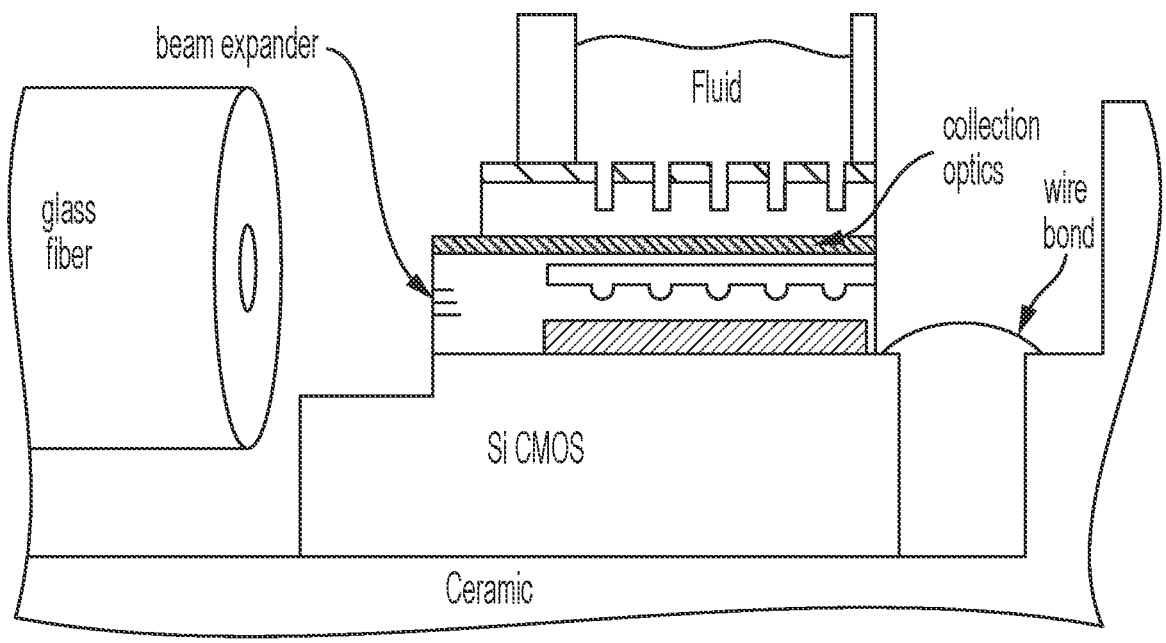
FIGS. 15A and 15B show optical analytical systems comprising a packaged edge-coupled target chip, where the optical delivery device in these systems is either a glass fiber (FIG. 15A) or a laser diode (FIG. 15B).

An exemplary process flow for fabrication of an exemplary edge coupler of this design is illustrated in FIGS. 14A-14E. Specifically, in step 1, as shown in FIG. 14A, a rejection filter stack (of approximately 31 µm thickness) is deposited and patterned on a Si CMOS detector substrate (of approximately 750 µm thickness) in the sequencing region of the chip (i.e., on the right side of the chip, as shown). In step 2, as shown in FIG. 14B, a $SiO_2$ layer is deposited and deplanarized across the entire surface of the chip using a reverse mask, and a thin $Si_3N_4$ layer is then deposited and patterned on the input coupler region of the chip to form the rib waveguide. In step 3, as shown in FIG. 14C, additional rib waveguide layers are added to the input coupler region of the chip, if desired. The lensing function is formed on the sequencing region of the chip, as indicated by the dips in the $SiO_2$ layer at each unit cell. In step 4, as shown in FIG. 14D, the high refractive index lens material is deposited, planarized, and patterned, and a subsequent layer of $SiO_2$ is then deposited and planarized. In step 5, the high index $Si_3N_4$ sequencing waveguide layer is formed with an inverse taper at the edge. This layer is covered with a top cladding layer and an aluminum layer in which the ZMWs are formed. The integrated structure of the chip, including the edge coupler (left) and the sequencing region of the chip (right) is shown in FIG. 14E. Further details regarding any of the above steps can be found, for example, in the process flows of U.S. Pat. No. 9,372,308 and U.S. Patent Publication No. 2016/0061740. The final structure of the packaged chip, together with the position of a glass fiber optical source relative to the beam expander coupler upon insertion of the chip into an optical analytical system, is illustrated in FIG. 15A.

Figure 15B:
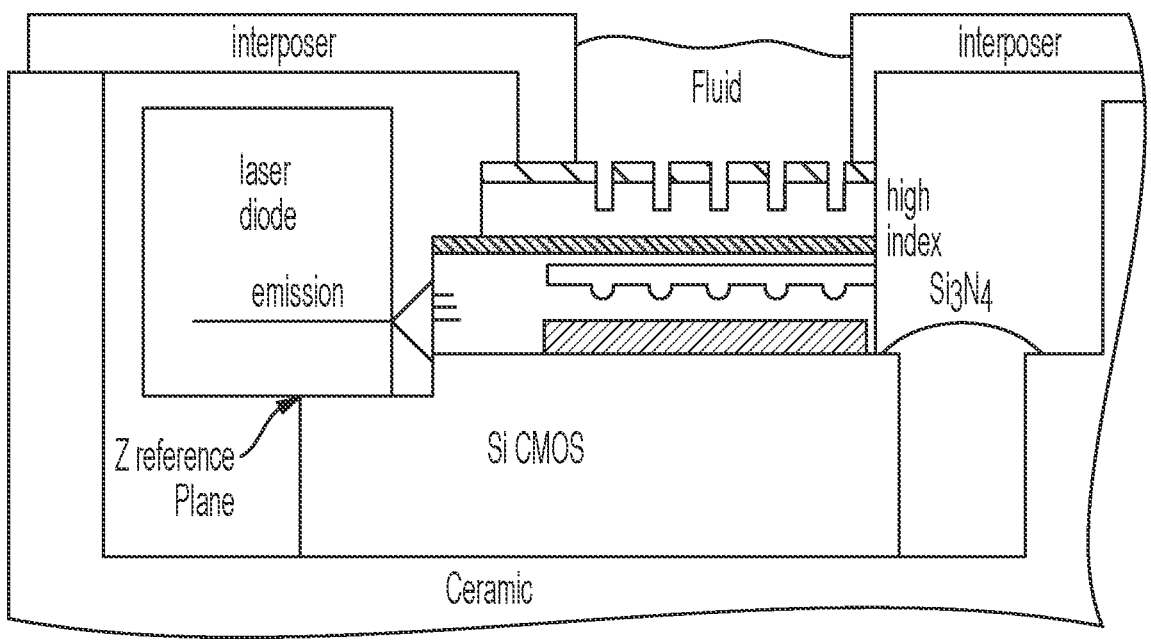

The above-described integrated beam expander optics can also be used for coupling light from a laser diode into a sequencing chip, for example as illustrated in FIG. 15B. In this case, it may be advantageous to attach the semiconductor laser diode to a transposer layer that also contains metal traces for electrical drive and alignment marks. A lithographic etch stop on the Si CMOS/photonic die can provide a well-defined "Z" reference plane to aid in aligning the laser emission to the chip, for example as indicated in FIG. 15B. As also shown in FIGS. 15A and 15B, a "fluid" reservoir can be in fluidic contact with the array of ZMWs on the surface of each chip to deliver sequencing reagents (e.g., DNA templates/primers and fluorescent nucleotides) to the reaction wells of each unit cell on the chip.

It will be readily apparent to one of ordinary skill in the relevant arts that other suitable modifications and adaptations to the analytical devices, systems, and methods described herein can be made without departing from the scope of the invention or any embodiment thereof.

All patents, patent publications, and other published references mentioned herein are hereby incorporated by reference in their entireties as if each had been individually and specifically incorporated by reference herein.

While specific examples have been provided, the above description is illustrative and not restrictive. Any one or more of the features of the previously described embodiments can be combined in any manner with one or more features of any other embodiments in the present invention. Furthermore, many variations of the invention will become apparent to those skilled in the art upon review of the specification. The scope of the invention should, therefore, be determined by reference to the appended claims, along with their full scope of equivalents.

What is claimed is:

1. An optical analytical system for nucleic acid sequencing comprising:
    a plurality of multiplexed optical chips, each multiplexed optical chip comprising;
        a plurality of reaction regions;
        at least one optical waveguide in optical connection with the plurality of reaction regions;
        an input optical coupler in optical connection with the at least one optical waveguide; and
        an optical detector in optical connection with the plurality of reaction regions;
    an optical source; and
    a plurality of optical delivery devices in optical connection with the optical source, wherein at least one multiplexed optical chip is removably coupled into the optical analytical system;
wherein at least one optical delivery device illuminates the input optical coupler of the at least one multiplexed optical chip,
wherein the optical detector comprises a plurality of pixels, and
wherein the at least one optical delivery device and the at least one multiplexed optical chip are optically aligned by measuring an optical signal from at least one reaction region by at least one pixel in the plurality of pixels.

2. The optical analytical system of claim 1, wherein at least one optical delivery device outputs no more than two optical beams or no more than one optical beam.

3. The optical analytical system of claim 1, wherein at least one multiplexed optical chip comprises no more than two input optical couplers or no more than one input optical coupler.

4. The optical analytical system of claim 1, wherein the optical analytical system comprises at least two multiplexed optical chips, at least three multiplexed optical chips, at least four multiplexed optical chips, at least six multiplexed optical chips, or at least eight multiplexed optical chips.

5. The optical analytical system of claim 1, wherein the optical analytical system comprises at least two optical delivery devices, at least three optical delivery devices, at least four optical delivery devices, at least six optical delivery devices, or at least eight optical delivery devices.

6. The optical analytical system of claim 1, wherein at least one multiplexed optical chip comprises at least 2, at least 5, at least 10, at least 50, at least 100, at least 500, at least 1,000, at least 5,000, at least 10,000, or at least 50,000 optical waveguides.

7. The optical analytical system of claim 1, wherein at least one optical delivery device outputs no more than one optical beam.

8. The optical analytical system of claim 1, wherein the at least one optical delivery device or the at least one multiplexed optical chip are moved relative to each other to increase the optical signal from the at least one reaction region.

9. The optical analytical system of claim 8, wherein the optical signal from the at least one reaction region is maximized.

10. The optical analytical system of claim 1, wherein the optical analytical system does not comprise an alignment camera.

11. The optical analytical system of claim 1, wherein at least one reaction region requires a power density of no more than $1.0\ \mu W/\mu m^2$, no more than $0.5\ \mu W/\mu m^2$, no more than $0.4\ \mu W/\mu m^2$, no more than $0.3\ \mu W/\mu m^2$, no more than $0.2\ \mu W/\mu m^2$, or no more than $0.1\ \mu W/\mu m^2$.

12. The optical analytical system of claim 1, wherein the optical source comprises no more than four lasers, no more than two lasers, or no more than one laser.

13. The optical analytical system of claim 12, wherein the optical source comprises two wavelength-tunable lasers, each laser outputting no more than 1000 mW at a wavelength from 450 nm to 700 nm.

14. The optical analytical system of claim 1, further comprising a planar lightwave circuit optically coupled to the optical source and to at least one optical delivery device.

15. The optical analytical system of claim 14, wherein the planar lightwave circuit comprises a plurality of optical channels, and wherein the planar lightwave circuit controls optical switching between the plurality of optical channels.

16. The optical analytical system of claim 14, wherein the planar lightwave circuit comprises a plurality of optical channels, and wherein at least one optical channel comprises an active power control.

17. The optical analytical system of claim 16, wherein the active power control is a variable optical attenuator.

18. The optical analytical system of claim 14, wherein the optical analytical system comprises at least two optical delivery devices, at least three optical delivery devices, at least four optical delivery devices, or at least six optical delivery devices.

19. The optical analytical system of claim 14, wherein the optical analytical system comprises at least two multiplexed optical chips, at least three multiplexed optical chips, at least four multiplexed optical chips, or at least six multiplexed optical chips.

20. The optical analytical system of claim 14, wherein at least one multiplexed optical chip comprises no more than two input optical couplers or no more than one input optical couplers.

21. The optical analytical system of claim 14, wherein the optical analytical system comprises two planar lightwave circuits optically coupled to the optical source and to the at least one optical delivery device.

22. The optical analytical system of claim 1, wherein the at least one optical waveguide is configured to minimize loss of power of an input optical signal at the plurality of reaction regions.

23. The optical analytical system of claim 22, wherein the at least one optical waveguide has a wedged shape.

24. The optical analytical system of claim 22, wherein the at least one optical waveguide is slanted relative to a row of reaction regions on at least one multiplexed optical chip.

25. The optical analytical system of claim 22, wherein the at least one optical waveguide is a routing waveguide that bisects at least one multiplexed optical chip.

26. The optical analytical system of claim 1, further comprising a computer that receives at least one electronic signal from the optical detector of the at least one multiplexed optical chip and that analyzes the at least one electronic signal.

27. The optical analytical system of claim 26, wherein the at least one electronic signal provides nucleic acid sequence information.

28. The optical analytical system of claim 1, wherein the optical source has a wavelength of excitation from about 450 nm to about 700 nm or from about 500 nm to about 650 nm.

29. The optical analytical system of claim 1, wherein at least one multiplexed optical chip is fabricated on a silicon chip.

30. The optical analytical system of claim 1, wherein the optical detector of at least one multiplexed optical chip comprises a CMOS sensor.

31. The optical analytical system of claim 1, wherein the plurality of reaction regions of at least one multiplexed optical chip comprise a plurality of nucleic acid samples.

* * * * *